(12) United States Patent
Pinto et al.

(10) Patent No.: US 11,556,424 B2
(45) Date of Patent: Jan. 17, 2023

(54) NON-VOLATILE STORAGE DEVICE HAVING FAST BOOT CODE TRANSFER WITH LOW SPEED FALLBACK

(71) Applicant: WESTERN DIGITAL TECHNOLOGIES, INC., San Jose, CA (US)

(72) Inventors: Yoseph Pinto, Tel Aviv (IL); Rampraveen Somasundaram, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/340,027

(22) Filed: Jun. 6, 2021

(65) Prior Publication Data
US 2022/0229731 A1 Jul. 21, 2022

(30) Foreign Application Priority Data
Jan. 19, 2021 (IN) .............................. 202141002371

(51) Int. Cl.
*G11C 29/00* (2006.01)
*G06F 11/14* (2006.01)
*G06F 11/30* (2006.01)
*G06F 11/07* (2006.01)
*G06F 11/10* (2006.01)

(52) U.S. Cl.
CPC ...... *G06F 11/1417* (2013.01); *G06F 11/0772* (2013.01); *G06F 11/1068* (2013.01); *G06F 11/3037* (2013.01)

(58) Field of Classification Search
CPC ............ G06F 11/1417; G06F 11/3037; G06F 11/0772; G06F 11/1068
See application file for complete search history.

(56) References Cited

U.S. PATENT DOCUMENTS 7,234,052 B2 6/2007 Lee
7,684,276 B2 3/2010 Janzen
(Continued)

OTHER PUBLICATIONS

TN-29-16: Boot-from-NAND with the TI OMAP2420 Processor Overview, Micron Technology, Inc., 2006, Available at: https://www.micron.eom/support/~/media/FDF88DE9D6CD4BB8B2F4D8BA8EF00946.ashx.
(Continued)

*Primary Examiner* — Samir W Rizk
(74) *Attorney, Agent, or Firm* — Vierra Magen Marcus LLP

(57) ABSTRACT

A storage system comprises a non-volatile memory configured to store boot code and a control circuit connected to the non-volatile memory. In response to a first request from a host to transmit the boot code, the storage system commences transmission of the boot code to the host at a first transmission speed. Before successfully completing the transmission of the boot code to the host at the first transmission speed, it is determined the boot code transmission has failed. Therefore, the host will issue a second request for the boot code. In response to the second request for the boot code, and recognizing that this is a fallback condition because the previous transmission of the boot code failed, the storage apparatus re-transmits the boot code to the host at a lower transmission speed than the first transmission speed.

19 Claims, 19 Drawing Sheets

(56) References Cited

U.S. PATENT DOCUMENTS

| | | |
|---|---|---|
| 8,417,774 B2 | 4/2013 | Flynn |
| 9,164,897 B2 | 10/2015 | Vasilyuk |
| 10,725,792 B2 | 7/2020 | Sela |
| 2017/0351458 A1 | 12/2017 | Caraccio |
| 2020/0057653 A1* | 2/2020 | Lee ........................ G06F 3/0658 |

OTHER PUBLICATIONS

Suruprasad Kempahonnaiah, "MultiBoot and Fallback Using ICAP in UltraScale+ FPGAs," Zilinx, Jun. 23, 2017, Available at: https://www.xilinx.com/support/documentation/application_notes/xapp1296-multiboot-fallback-icap.pdf.

* cited by examiner

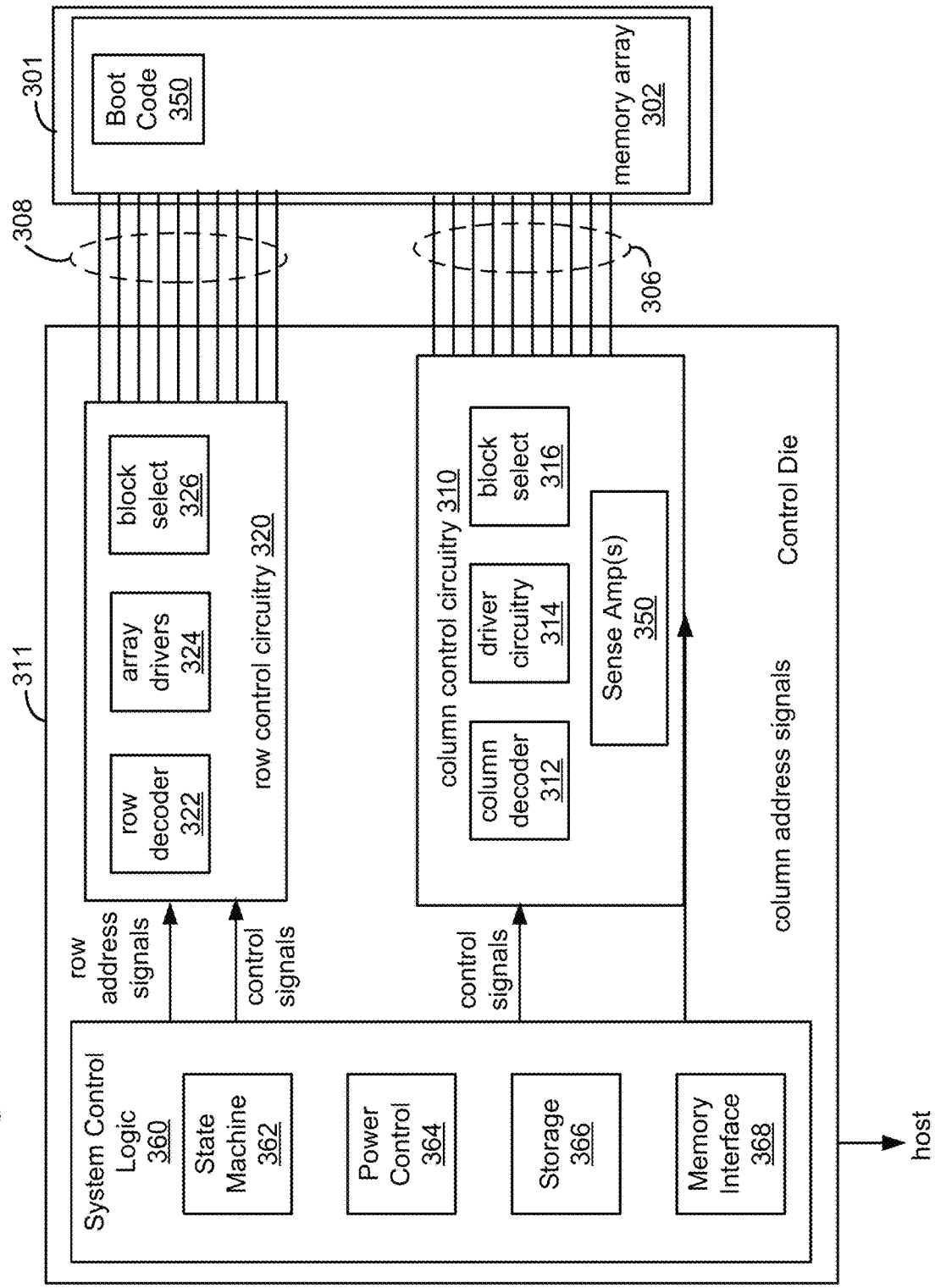

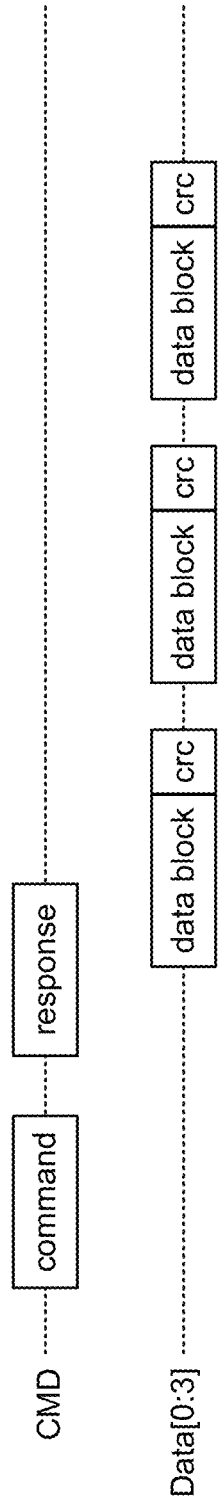

US 11,556,424 B2

NON-VOLATILE STORAGE DEVICE HAVING FAST BOOT CODE TRANSFER WITH LOW SPEED FALLBACK

BACKGROUND

Many electronics devices make use of embedded or connected storage systems. Often, the embedded or connected storage systems include non-volatile memory such as flash memory. An electronic device that includes an embedded or connected storage system is referred to as a host.

The process of a host starting operation and entering a state of readiness for intended operation is called "booting" or a "boot process." A host typically has a ROM (Read Only Memory) which stores minimal code to start the boot process. When a host is turned on or restarted, it will execute the code stored in the ROM which instructs the host to upload the full boot code from a dedicated portion of the embedded or connected storage system. The boot code will be used by the host to perform the boot process.

As users of an electronic device typically do not like to wait too long for a boot process to complete, it is desired that the transmission of the full boot code from the embedded or connected storage system be performed at a high transmission speed. In some instances, the transmission speed for the boot code is preprogrammed in the embedded or connected storage system. A problem occurs, however, when line conditions (e.g., temperature, interference and/or line delays) become unfavorable for communication at the preprogrammed transmission speed. For example, the boot code may become corrupted during transmission from the storage system to the host. If the boot code cannot be read by the host, then the host and/or the storage system may be treated as being non-operable.

BRIEF DESCRIPTION OF THE DRAWINGS

Like-numbered elements refer to common components in the different figures.

FIG. 2B is a functional block diagram of an embodiment of an integrated memory assembly.

FIG. 3 is a timing diagram describing how a command is performed on an interface between a host and a storage system.

FIG. 4 is a block diagram depicting the structure of a command.

DETAILED DESCRIPTION

To prevent a host and/or the storage system from being treated as being non-operable, it is proposed to transfer the boot code at a fast speed and automatically fall back to a lower speed boot code transfer if there is a problem with the boot code transfer at the fast speed. A storage system implementing this proposal includes a non-volatile memory configured to store the boot code for the host and a control circuit connected to the non-volatile memory. In response to a first request from the host to transmit the boot code (e.g., at power-up, reset or otherwise), the storage system commences transmission of the boot code to the host at a first transmission speed. If it is determined the boot code transmission has failed (e.g., the boot code received at the host includes too many errors or is otherwise unusable due to unfavorable line conditions such as an extreme temperature, interference and/or other line delays), then the host will issue a second request for the boot code. In response to the second request for the boot code, and recognizing that this is a fallback condition because the previous transmission of the boot code failed, the storage system re-transmits the boot code to the host at a lower transmission speed. Transmitting at the lower speed may allow the boot code to be received successfully by the host.

Figure 1A:
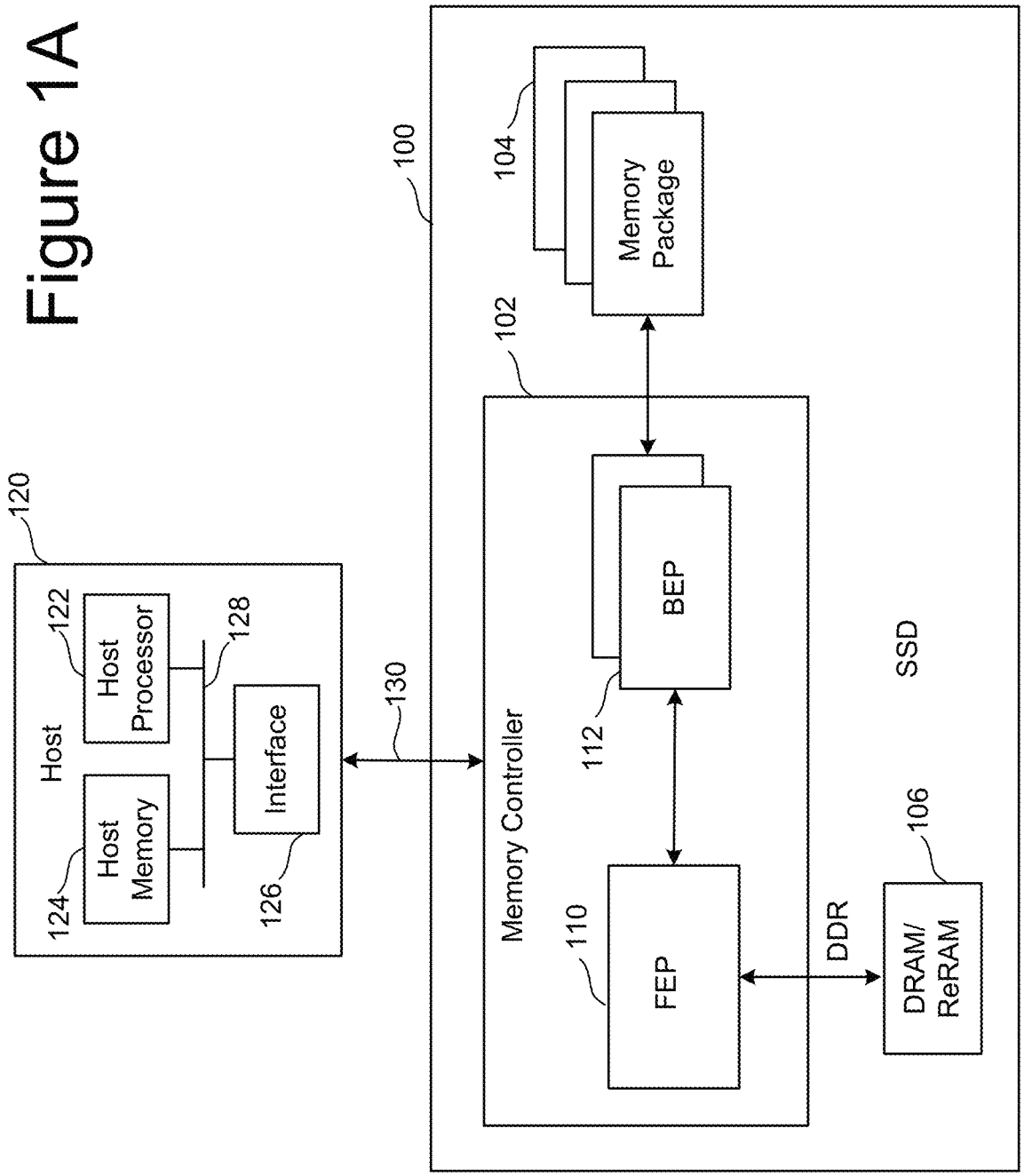
FIG. 1A is a block diagram of one embodiment of a storage system connected to a host.

FIG. 1A is a block diagram of one embodiment of a storage system 100 connected to a host system 120. Storage system 100 can implement the technology disclosed herein. Many different types of storage systems can be used with the technology disclosed herein. Example storage systems include a SD Card or solid-state drive ("SSD"); however, other types of storage systems can also be used. Storage system 100 comprises a memory controller 102, one or more memory package 104 for storing data, and local memory (e.g. DRAM/ReRAM) 106. Memory controller 102 comprises a Front-End Processor Circuit (FEP) 110 and one or more Back-End Processor Circuits (BEP) 112. In one embodiment FEP 110 circuit is implemented on an ASIC. In one embodiment, each BEP circuit 112 is implemented on a separate ASIC. In one embodiment, the ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two-dimensional NAND flash memory and/or three-dimensional NAND flash memory). In other embodiments, the memory package 104 can include other types of memory; for example, the memory package can include Phase Change Memory (PCM) memory or Magnetoresistive Random Access Memory (MRAM).

In one embodiment, memory controller 102 communicates with host system 120 using an interface 130. For working with storage system 100, host system 120 includes a host processor 122, host memory 124, and interface 126, which communicate over bus 128. Host memory 124 is the host's physical memory, and can be DRAM, SRAM, non-volatile memory, or another type of storage. Host 120 may also include a hard disk drive connected to bus 128 and/or a USB drive in communication with bus 128. Software (code) for programming host processor 122 can be stored in host memory 124, a hard disk drive connected to bus 128 or a USB drive. Host memory 124, a hard disk drive connected to bus 128, and a USB drive are examples of non-transitory processor readable storage mediums that store processor readable code that when executed on host processor 122 cause host processor 122 to perform the methods described below.

Host system 120 is external to and separate from storage system 100. In one embodiment, storage system 100 is embedded in or connected to host system 120. Memory controller 102 may communicate with host 120 via various types of communication interfaces, including for example, SD Card interface. NVMe over PCIe, NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like.

Figure 1B:
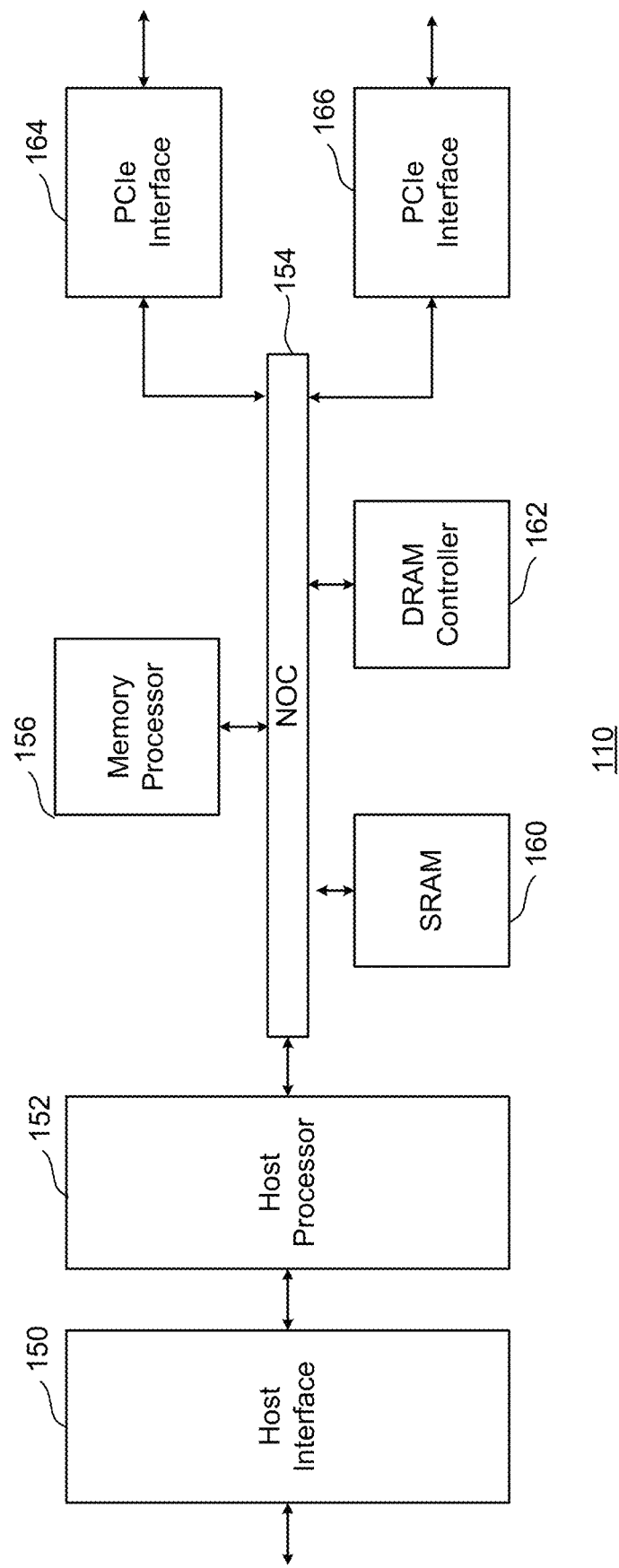
FIG. 1B is a block diagram of one embodiment of a Front-End Processor Circuit.

FIG. 1B is a block diagram of one embodiment of FEP circuit 110. FIG. 1B shows a host interface 150 to communicate with host system 120 and a host processor 152. Host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106, which is a volatile memory). SRAM 160 is local volatile RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface 164/166 communicates with one of the BEP circuits 112. In other embodiments, there can be more or fewer than two BEP circuits 112; therefore, there can be more than two PCIe Interfaces.

Figure 1C:
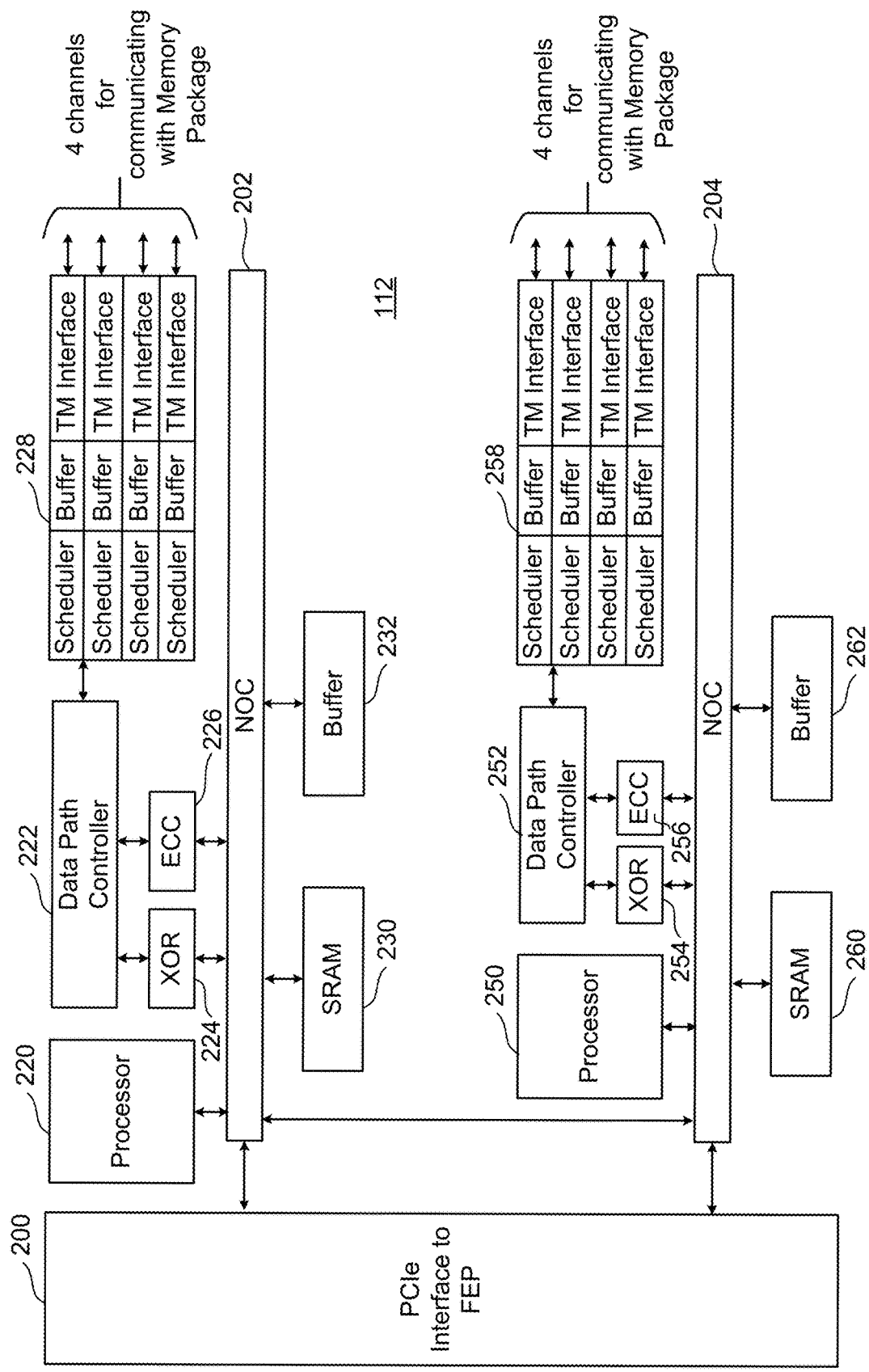
FIG. 1C is a block diagram of one embodiment of a Back-End Processor Circuit.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In one embodiment, the XOR engines 224/254 can recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with memory packages and the bottom NOC 204 is associated with memory interface 258 for four additional channels for communicating with memory packages. In one embodiment, each memory interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 1C. Additionally, controllers with structures different than FIGS. 1B and 1C can also be used with the technology described herein.

Figure 1D:
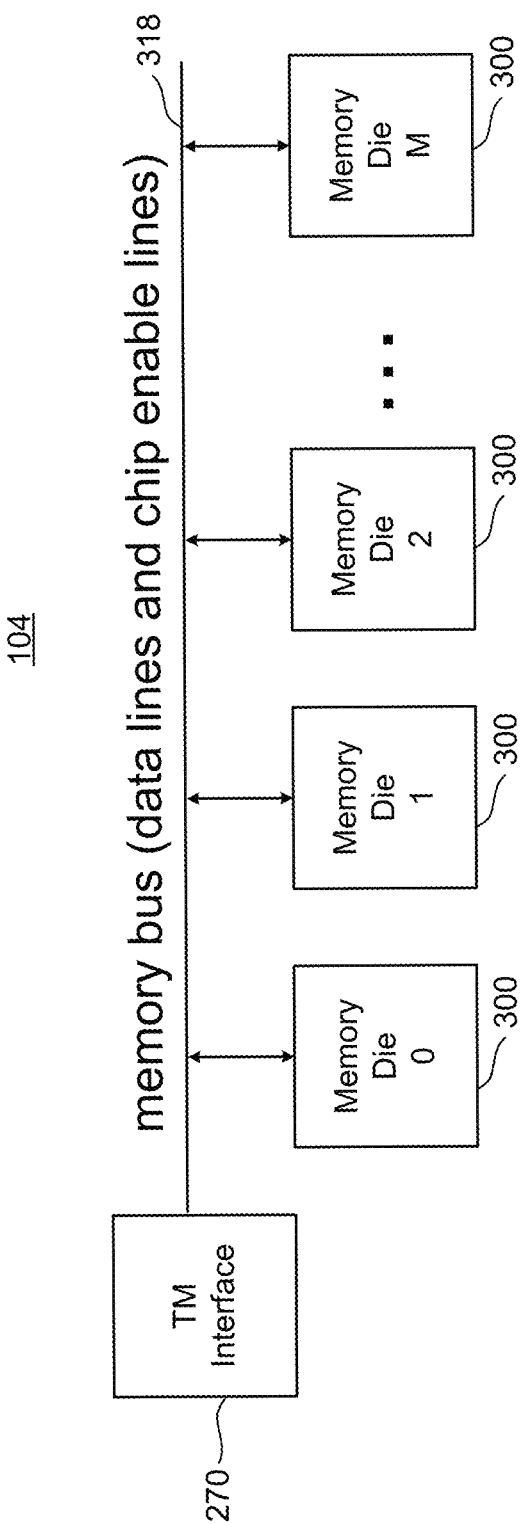
FIG. 1D is a block diagram of one embodiment of a memory package.

FIG. 1D is a block diagram of one embodiment of a memory package 104 that includes a plurality of memory dies 300 (Memory Die 0, Memory Die 1, Memory Die 2, . . . Memory Die M) connected to a memory bus (data lines and chip enable lines) 318. The memory bus 318 connects to a Toggle Mode Interface 270 for communicating with the TM Interface of a BEP circuit 112 (see e.g., FIG. 1C). In some embodiments, the memory package can include a small controller connected to the memory bus 318 and the TM Interface 270. In total, the memory package 104 may have eight or 16 memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 1E:
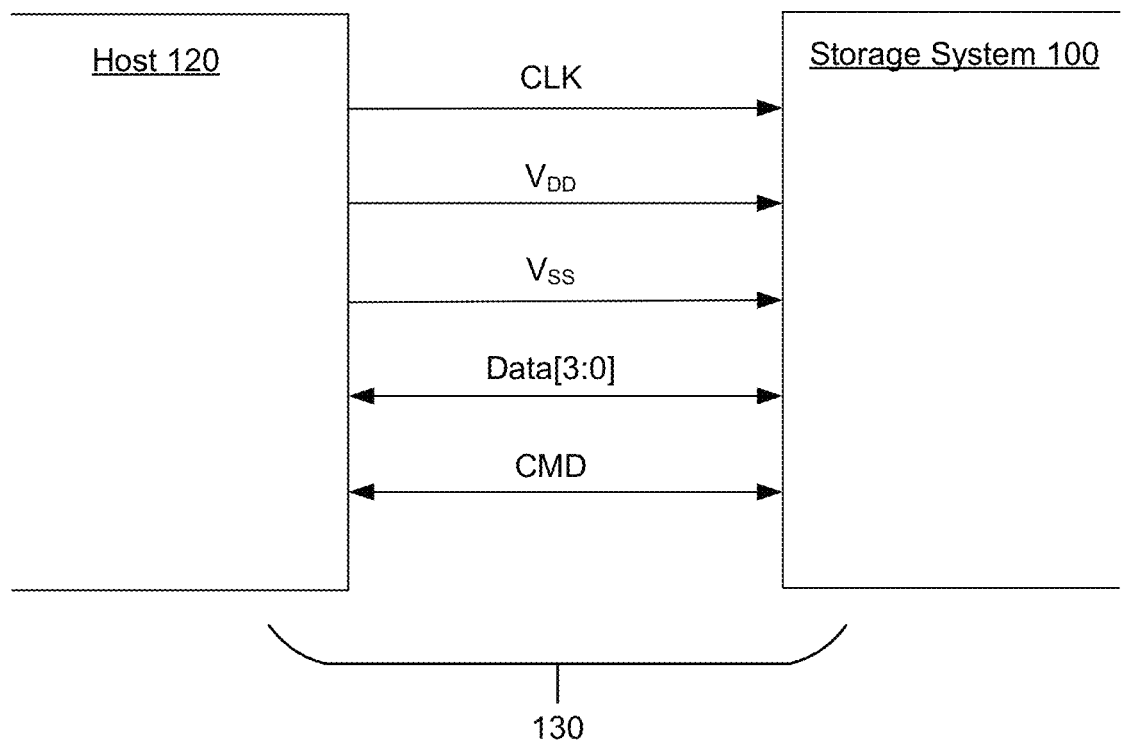
FIG. 1E is a block diagram of an interface between a host and a storage system.

FIG. 1E is a block diagram of interface 130 between host 120 and storage system 100. In one embodiment, interface 130 is a SD Card interface that includes the following signals: CLK, $V_{DD}$, $V_{SS}$, Data[3:0] and CMD. CLK is a host to storage system clock signal. $V_{DD}$ is a power signal provided to storage system 100. The voltage level provided on this signal is often also referred to as $V_{DD}$. $V_{SS}$ is a ground signal provided to storage system 100. Data[3:0] is a four bit bidirectional data bus. CMD is a one bit bidirectional command and response signal.

Figure 2A:
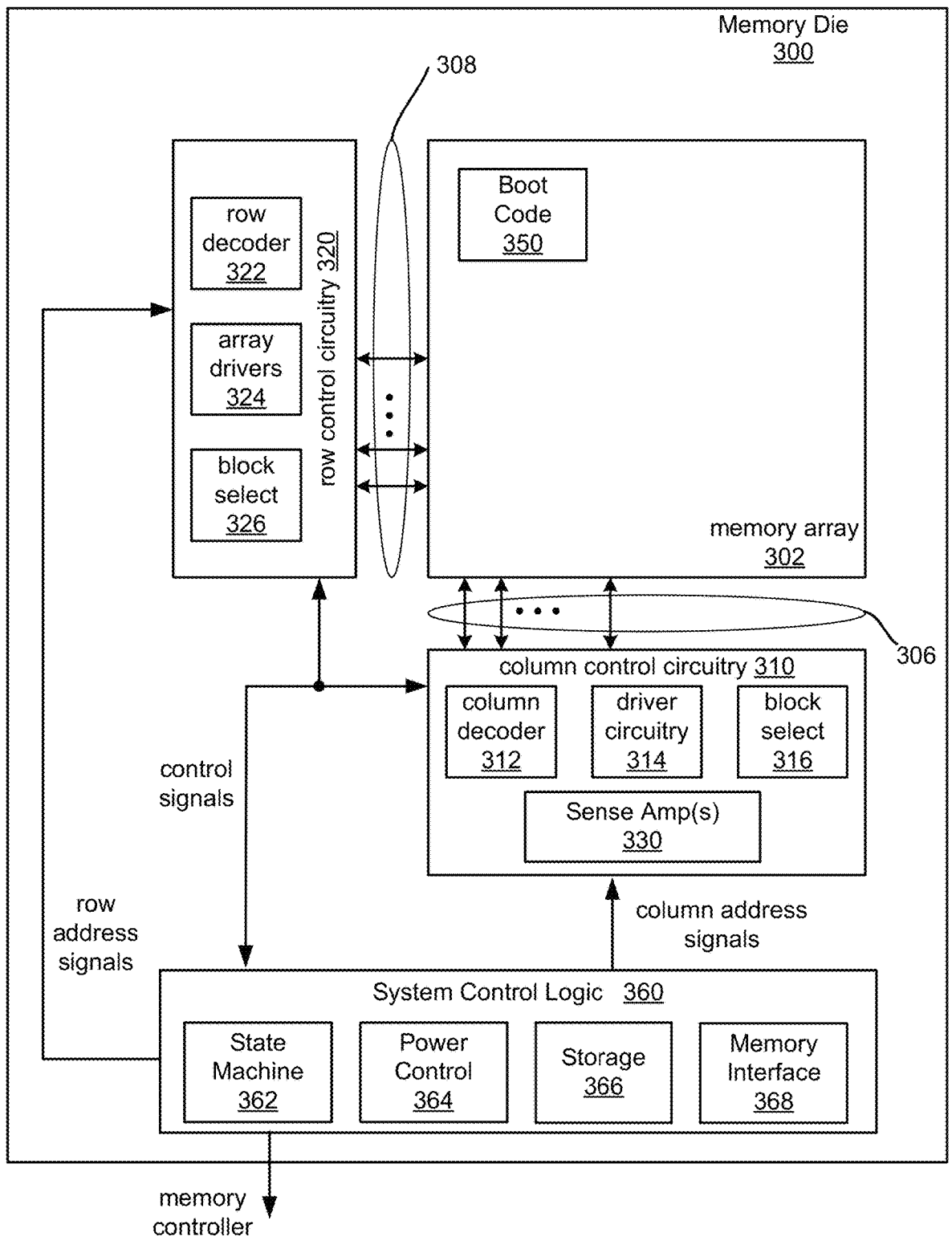
FIG. 2A is a functional block diagram of an embodiment of a memory die.

FIG. 2A is a block diagram that depicts one example of a memory die 300 that can implement the technology described herein. Memory die 300, which can correspond to one of the memory die 300 of FIG. 1C, includes a non-volatile memory array 302. All or a portion of memory array 302 is used to store boot code 350. In one embodiment, boot code 350 resides on one memory die 300. In another embodiment, the boot code 350 resides across multiple memory die 300. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only single block is shown for array 302, a memory die can include multiple arrays and/or multiple planes that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from host 120 and provides output data and status to memory controller 102. In some embodiments, the system control logic 360 include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 that controls the power and voltages supplied to the rows and columns of the memory array 302 during memory operations and may include charge pumps and regulator circuit for creating regulating voltages. System control logic 360 includes storage 366, which may be used to store parameters for operating the memory array 302.

Commands and data are transferred between memory controller 102 and memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the memory controller 102.

In some embodiments, all the elements of memory die 300, including the system control logic 360, can be formed as part of a single die. In other embodiments, some or all of the system control logic 360 can be formed on a different die.

For purposes of this document, the phrase "a control circuit" included any one or a combination of memory controller 102, state machine 362, a micro-controller, microprocessor, all of or a portion of system control logic 360, row control circuitry 320, column control circuitry 310 and/or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

In one embodiment, memory structure 302 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory array 302. No particular non-volatile memory technology is required for purposes of the new claimed embodiments proposed herein. Other examples of suitable technologies for memory cells of the memory array (or other type of memory structure) 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts, the structure of memory array 302 and the peripheral circuitry, which (in some embodiments) includes all of the structures 310, 320 and 360 other than memory array 302. An important characteristic of a memory circuit is its capacity, which can be increased by increasing the area of the memory die of storage system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functions that can be implemented on-chip. Consequently, a basic trade-off in the design of a memory die for the storage system 100 is the amount of area to devote to the memory structure 302 and the amount of area to devote to the peripheral circuitry.

Another area in which the memory array 302 and the peripheral circuitry are often at odds is in the processing involved in forming these regions, since these regions often involve differing processing technologies resulting in trade-offs in having differing technologies on a single die. For example, when the memory array 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory array 302 can be formed on one die (the memory die) and some or all of the peripheral circuitry elements, including one or more control circuits, can be formed on a separate die (the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one control die, other embodiments can use more die, such as two memory die and one peripheral circuitry die, for example.

FIG. 2B shows an alternative arrangement to that of FIG. 2A which may be implemented using wafer-to-wafer bonding to provide a bonded die pair, referred to as an integrated memory assembly. FIG. 2B depicts a functional block diagram of one embodiment of an integrated memory assembly 307. One or more integrated memory assemblies 307 may be used in a memory package 104 in storage system 100. The integrated memory assembly 307 includes two types of semiconductor die (or more succinctly, "die"). Memory die 301 includes memory array 302. Memory array 302 may contain non-volatile memory cells. A portion of memory array 302 is used to store boot code 350. Boot code 350 is used by host processor 124 to perform the boot process, as described above.

Control die 311 includes control circuitry 310, 320 and 360 (details of which are discussed above). In some embodiments, control die 311 is configured to connect to the memory array 302 in the memory die 301. FIG. 2B shows an example of the peripheral circuitry, including the control circuit(s), formed in a peripheral circuit or control die 311 coupled to memory array 302 formed in memory die 301. Common components are labelled similarly to FIG. 2A. System control logic 360, row control circuitry 320, and column control circuitry 310 are located in control die 311. In some embodiments, all or a portion of the column control circuitry 310 and all or a portion of the row control circuitry 320 are located on the memory die 301. In some embodiments, some of the circuitry in the system control logic 360 is located on the on the memory die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate memory controller 102 may also be used to fabricate system control logic 360, row control circuitry 320, and column control circuitry 310). Thus, while moving such circuits from a die such as memory die 301 may reduce the number of steps needed to fabricate such a die, adding such circuits to a die such as control die 311 may not require many additional process steps.

FIG. 2B shows column control circuitry 310 including sense amplifier(s) 350 on the control die 311 coupled to memory array 302 on the memory die 301 through electrical paths 306. For example, electrical paths 306 may provide electrical connection between column decoder 312, driver circuitry 314, and block select 316 and bit lines of memory array (or structure) 302. Electrical paths may extend from column control circuitry 310 in control die 311 through pads on control die 311 that are bonded to corresponding pads of the memory die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory array 302 through electrical paths 308. Each of electrical path 308 may correspond to a word line, dummy word line, or select gate line. Additional electrical paths may also be provided between control die 311 and memory structure die 301.

In some embodiments, there is more than one control die 311 and/or more than one memory die 301 in an integrated memory assembly 307. In some embodiments, the integrated memory assembly 307 includes a stack of multiple control die 311 and multiple memory die 301. In some embodiments, each control die 311 is affixed (e.g., bonded) to at least one of the memory structure dies 301.

Figure 2C:
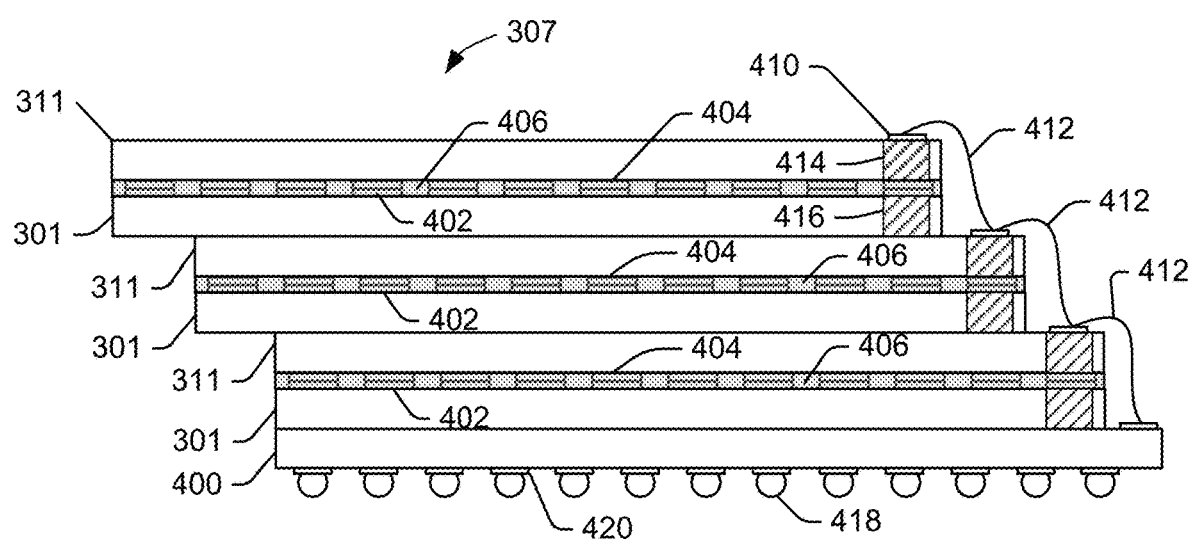
FIG. 2C depicts one embodiment of an integrated memory assembly.

As noted herein, there may be more than one control die 311 and more than one memory die 301 in an integrated memory assembly 307. In some embodiments, the integrated memory assembly 307 includes a stack of multiple control die 311 and multiple memory die 301. FIG. 2C depicts a side view of one embodiment of an integrated memory assembly 307 stacked on a substrate 400. The integrated memory assembly 307 has three control die 311 and three memory die 301. Each control die 311 is bonded to one of the memory die 301. Some of the bond pads 402, 404 are depicted. There may be many more bond pads. A space between two dies 301, 311 that are bonded together is filled with a solid layer 406, which may be formed from epoxy, other resin or polymer. This solid layer 406 protects the electrical connections between the dies 301 and 311, and further secures the dies together. Various materials may be used as solid layer 406, but in embodiments, it may be Hysol epoxy resin from Henkel Corp., having offices in California, USA.

The integrated memory assembly 307 may for example be stacked with a stepped offset, leaving bond pads 410 at each level uncovered and accessible from above. Wire bonds 412 connected to the bond pads 410 connect the control die 311 to the substrate 400. A number of such wire bonds may be formed across the width of each control die 311 (i.e., into the page of FIG. 2C).

A through silicon via (TSV) 414 may be used to route signals through a control die 311. A through silicon via (TSV) 416 may be used to route signals through a memory die 301. The TSVs 414, 416 may be formed before, during or after formation of the integrated circuits in the semiconductor dies 301, 311. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

In regard to one embodiment of the implementation depicted in FIG. 2C, the various depicted TSV 414 and 416, connected to the bond pads 410 and wire bonds 412, may be used so that multiple control die 311 can communicate with each other and multiple control die 311 can transmit data between each other so, for example, a first control die can read data from its bonded memory die, transfer that data (after some optional processing) to a second control die and the second control die can program that data into the memory die bonded to the second control die.

Solder balls 418 may optionally be affixed to contact pads 420 on a lower surface of substrate 400. The solder balls 418 may be used to electrically and mechanically couple the integrated memory assembly 307 to a printed circuit board. Solder balls 418 may be omitted where the integrated memory assembly 307 is to be used as an LGA package. The solder balls 418 may form a part of the interface between the integrated memory assembly 307 and memory controller 102.

In the embodiment of FIG. 2C, the memory dies 301 and the control dies 311 are arranged as pairs. That is, each memory die 301 is bonded to and in communication with a corresponding/matching/paired control die 311. In other embodiments, a control die may be bonded (or otherwise connected) to more than one memory die.

As discussed above, in one embodiment interface 130 between storage system 100 and host 120 is a SD Card interface (see e.g., FIG. 1E). In one embodiment, communication over a SD Card interface is based on a command and data bit streams. A command is a token that starts an operation. A command is sent from host 120 to storage system 100 (e.g., memory controller 102). A command is transferred serially on the CMD line. A Response is a token that is sent from storage system 100 (e.g., memory controller 102) to host 120 as an answer to a previously received command. A response is transferred serially on the CMD line. Data can be transferred from host 120 to storage system 100, or from storage system 100 to host 120, via the data lines Data [3:0]. Data transfers are done in SD data bocks. A cyclic redundancy check (CRC) is an error-detecting code commonly used in digital networks and storage devices to detect unwanted changes to raw data. SD data blocks include CRC bits. A command can result in the transfer of one or multiple SD data blocks (with CRC bits for each SD data block).

FIG. 3 is a timing/signal diagram that depicts the CMD line and Data[3:0] of interface 130 over time. FIG. 3 includes an example of a command from host 120 to storage system 100 on the CMD line, resulting in storage system 100 (e.g., memory controller 102) sending a response token on the CMD line and a plurality of data blocks in Data[3:0], with CRC bits appended to each SD data block. For example, the command of FIG. 3 may include a request to send boot code 350 and the data blocks may comprise boot code 350 (read from memory array 302) with CRC bits added. Alternatively, the command of FIG. 3 may include a request to read data from memory array 302 and the data blocks may the data read.

FIG. 4 depicts the structure of one embodiment of a command sent from host 120 to storage system 100 on the CMD line. In this embodiment, the command has 48 bits. The command starts with a Start Bit (e.g., 0) followed by a bit indicating direction of transmission (e.g., 1=from host 120). The next six bits indicate the Command Index of the command, this value being interpreted as a binary coded number between 0 and 63 indicating which command of the command set is being issued. Some commands need an Argument, which is coded by a thirty two bit data pattern [39:8]. Following the argument is eight CRC bits. Commands are terminated by an End Bit (e.g., 1). One example of a command is the Idle command (e.g., CMD0), which requests storage system 100 to enter an idle state and has an Command Index equal to 0 (in one embodiment). Typically, the bits of the Argument [39:8] of CMD0 are set to 0.

As discussed above, storage system 100 stores boot code 350 for host 120. Host 120 has a ROM (not depicted in FIG. 1) which stores minimal code to start the boot process. When host 120 is turned on or restarted, it will execute the code stored in the ROM which instructs host 120 to upload the full boot code 350 from storage system 100. The boot code will be used by host processor 124 to perform the boot process.

To increase performance, it is optimal if boot code 350 is transferred from storage system 100 to host 120 at a high transmission speed. A problem occurs, however, when line conditions (e.g., temperature, interference and/or line delays) become unfavorable for communication at the high transmission speed. For example, due to extreme temperature, interference or other line delays, boot code 350 may become corrupted during transmission from storage system 100 to the host 120. If boot code 350 cannot be read by host 120, then host 120 and/or storage system 100 may be treated as being non-operable.

Figure 5:
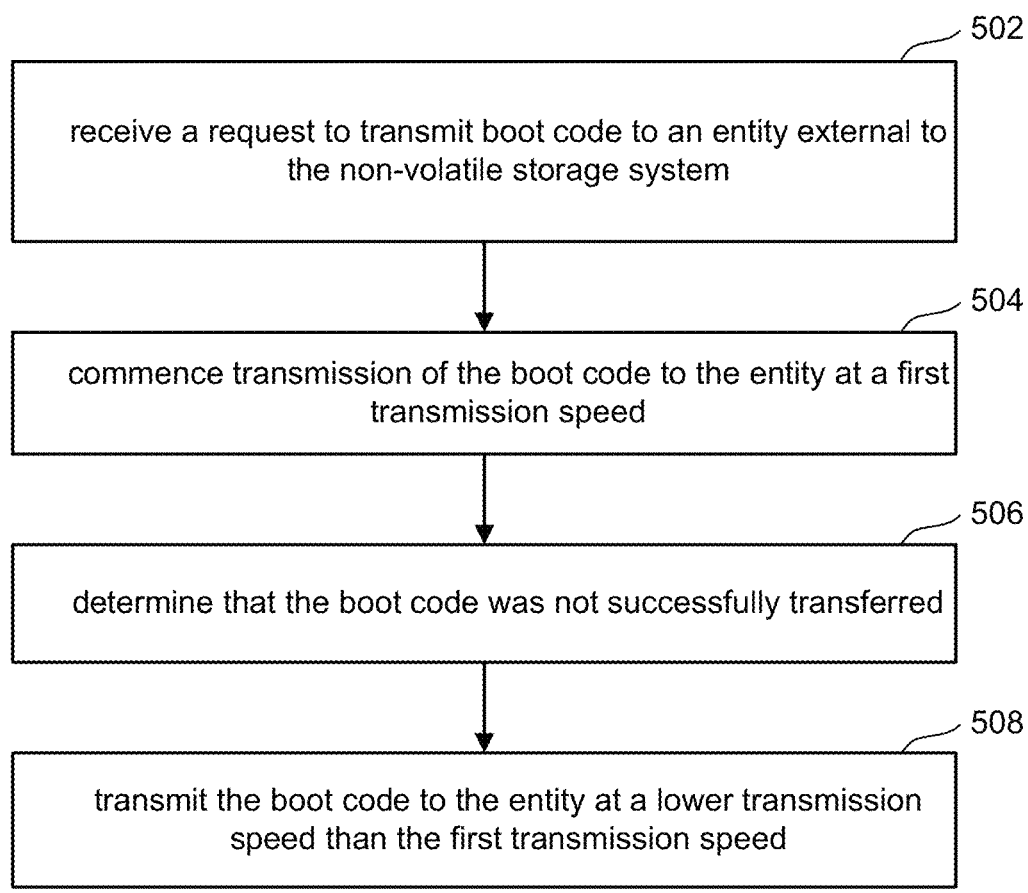
FIG. 5 is a flow chart describing one embodiment of a process for transferring boot code from a storage system to a host.

To prevent host 120 and/or the storage system 100 from being treated as being non-operable, it is proposed to transfer the boot code at a fast speed and automatically fall back to a lower speed boot code transfer if there is a problem with the boot code transfer at the fast speed. FIG. 5 is a flow chart describing one embodiment of a process for implementing a fast boot code transfer from storage system 100 to host 120 with a fall back to a lower speed boot code transfer if there is a problem with the fast boot code transfer. In one embodiment, the process of FIG. 5 is performed by any of the control circuits of storage system 100 discussed above. For example, in one implementation, the process of FIG. 5 is performed by or at the direction of memory controller 102 (or another processor in storage system 100).

In step 502 of FIG. 5, the control circuit receives a request to transmit boot code 350 to an entity external to storage system 100. In one embodiment, host 120 is the entity external to storage system 100 and the control circuit receives the request from host 120. In step 504, the control circuit commences transmission of boot code 350 to the entity at a first transmission speed (e.g., a fast transmission speed) via interface 130. In one example implementation, the control circuit reads boot code 350 from non-volatile memory array 302 and adds CRC bits (error correction) to the boot code prior to the commencing transmission of the boot code to create a plurality of data blocks that are transferred to host 120 via Data[3:0], as depicted in FIG. 3. In step 506, the control circuit determines that boot code 350 was not successfully transferred. In one embodiment, the control circuit is configured to determine that the boot code was not successfully transferred by receiving an indication from the host that the boot code was not successfully transferred. More details are provided below. In step 508, the control circuit transmits boot code 350 to the entity via interface 130 at a lower transmission speed than the first transmission speed. In one embodiment, in response to determining that boot code 350 was not successfully transferred, the control circuit is configured to automatically choose the lower transmission speed. In one example implementation, the control circuit is configured to use the lower transmission speed without an indication to use the lower transmission speed from host 120.

In one embodiment, interface 230 can operate in three modes, each with its own transmission speed. The table below provides one example of the multiple transmission speeds for interface 230.

| Mode | Transmission Speed |
| --- | --- |
| SD HS | 25 MB/s |
| DDR50 | 50 MB/s |
| SDR104 | 104 MB/s |

The transmission speed indicates the amount of data that can be transmitted on Data[3:0] per one second of time. The modes SD HS and SDR104 transmits data on the rising edge of the clock signal CLK. The mode DDR50 transmits data on the rising edge and the falling edge of the clock signal CLK. In one embodiment, the clock speed is the same for SD HS and DDR50, but DDR50 has a higher transmission speed for data on Data[3:0] because data is transmitted on the rising edge and the falling edge of the clock signal CLK for DDR50. In other embodiments, more than three modes of operation and more than three transmission speeds can be implemented, and/or different modes of operation and different transmission speeds can be implemented. As per the table above, SD HS is the mode with the lowest transmission speed (25 MB/s) and SDR104 is the mode with the highest transmission speed (104 MB/s).

In one example implementation, step 504 includes transferring boot code at the highest transmission speed of 104 MB/s (SDR104) and step 508 includes transferring boot code at the lowest transmission speed of 25 MB/s (SD HS) even though there is another transmission speed (e.g., DDR50 at 50 MB/s) that is lower than the first transmission speed (e.g., SDR104 at 104 MB/s) and higher than the lowest transmission speed (e.g., SD HS at 25 MB/s).

In another example implementation, step 504 includes transferring boot code at the highest transmission speed of 104 MB/s (SDR104) and step 508 includes transferring boot code at the next lowest transmission speed relative to the first transmission speed. In this example, the next lowest transmission speed relative to the first transmission speed is 50 MB/s (DDR50). Note that the next lowest transmission speed (e.g., DDR50 at 50 MB/s) is higher than the lowest transmission speed (e.g., SD HS at 25 MB/s).

Note that in the process of FIG. 5, all or a portion of boot code 350 is transferred (or attempted to be transferred) twice: once in step 504 and a second time in step 508. In both steps 504 and 508, the same boot code is transferred. Thus, in both steps 504 and 508 the control circuit reads the same boot code 350 from the same location in memory array 302 and sends the same boot code 350 to host 120.

In some embodiments, the control circuit is configured to transmit a tuning block to host 120 prior to commencing transmission of boot code 350 in order for host 120 to tune reception of data from storage system 100. The tuning block is a known block of data that can be used to tune the sampling point for host 120. Tuning compensates for static delays in the timing budget including process, voltage and different PCB loads and skews. In some embodiments, the known block of data comprising the tuning block is sent to the host forty times. In other embodiments, the known block of data comprising the tuning block can be sent to the host more or less than forty times. In one embodiment, the tuning block contains sixty four bytes of predefined data transmitted on Data[3:0]. In some embodiments, CRC bits are added to the tuning block. In some embodiments that include tuning blocks, the determining that the boot code was not successfully transferred in step 506 can include determining that the boot code was not successfully transferred because host 120 failed to successfully receive the tuning block, host 120 failed to successfully tune reception using the tunning block and/or host 120 failed to successfully receive boot code 350 after successfully tuning.

Figure 6:
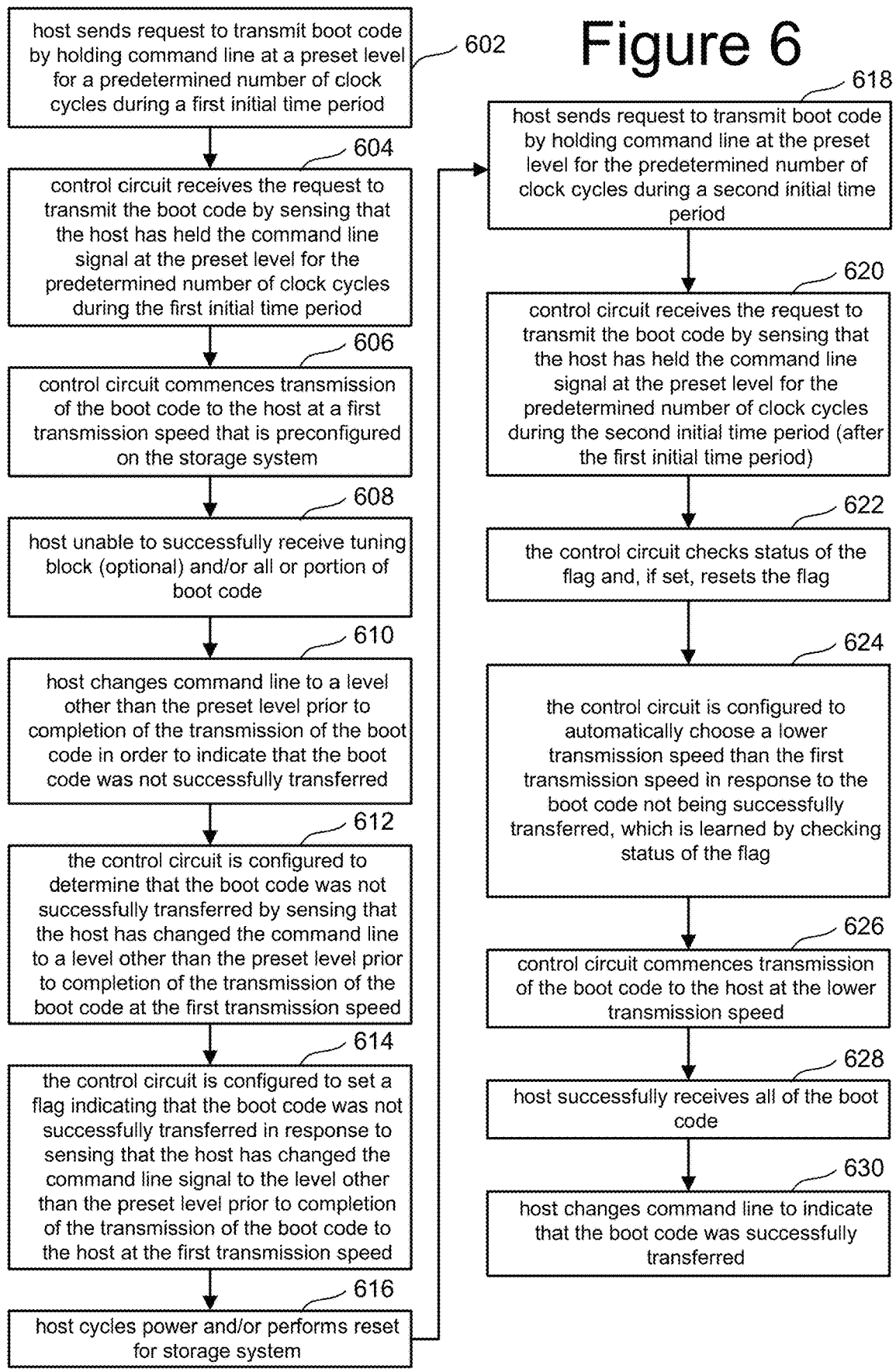
FIG. 6 is a flow chart describing one embodiment of a process for transferring boot code from a storage system to a host.

FIG. 6 is a flow chart describing one embodiment of a process for implementing a fast boot code transfer from storage system 100 to host 120 with a fall back to a lower speed boot code transfer if there is a problem with the fast boot code transfer. In one embodiment, the process of FIG. 6 is performed by any of the control circuits of storage system 100 discussed above. For example, in one implementation, the process of FIG. 6 is performed by or at the direction of memory controller 102 (or another processor in storage system 100). The process of FIG. 6 is one example implementation of the process of FIG. 5.

In step 602 of FIG. 6, host 120 sends a request to transmit boot code 350 by holding down the command line CMD at a preset level for a predetermined number of clock cycles during a first initial time period. In one embodiment of the storage system 100, when the host first turns on the power, or cycles the power, or resets start system 100, if host 120 holds CMD low (e.g. ground, 0 v or a preset low voltage), for 75 or more clock cycles, this is treated as a command or request for storage system 100 to transmit boot code 350 to host 120. In step 604, the control circuit (e.g. memory controller 102) receives the request from host 120 to transmit boot code 350 by sensing that host 120 has held the command line CMD at the preset level for the predetermined number of clock cycles during the first initial time period. In one embodiment steps 602 and 604 are an example implementation of step 502 of FIG. 5. In step 606 of FIG. 6, the control circuit commences transmission of the boot code to the host at a first transmission speed as preconfigured on storage system 100. For example, storage system 100 may include a register or set of registers for which host 100 can program the transmission speed that should be used for transmission of the boot code. In another embodiment, storage system 100 can be preconfigured to transmit at a transmission speed. In one embodiment, step 606 is an example implementation of step 504 of FIG. 5.

As discussed above, in some embodiments, prior to sending the actual boot code, the storage system 100 will transmit a tuning block. In step 608, the host is unable to successfully receive the boot code. For example, the host 120 may be unable to successfully receive the tuning block, unable to successfully perform the tuning using the tuning block, or unable to receive all or a portion of the boot code 350. In step 610, the host changes the command line to a level other than the preset level prior to completion of the transmission of the boot code in order to indicate that the boot code was not successfully transferred. Thus, if the tuning failed or the boot code was not successfully received, the host will change the command line CMD to indicate a failure. For example, if the host holds the command line CMD line at ground to indicate a request to transmit the boot code then in step 610 the host will change the command line CMD line to $V_{DD}$ or other positive voltage. In step 612, the control circuit of storage system 100 is configured to determine that the boot code was not successfully transferred by sensing that the host has changed the command line CMD to a level other than the preset level prior to completion of the transmission of the boot code at the first transmission speed. In one embodiment, the first transmission speed is any of the three transmission speeds indicated above. In step 614, the control circuit is configured to set a flag indicating that the boot code was not successfully transferred in response to sensing that the host has changed the command line CMD to the level other than the preset level prior to completion of the transmission code. For example, storage system 100 may include a location in non-volatile storage to store a flag bit that indicate whether the boot code was successfully transmitted or not successfully transmitted. In one embodiment, step 608-614 are an example implementation of step 506 of FIG. 5.

In step 616 of FIG. 6, host 120 cycles power (turn power off and then power on) and/or performs a reset of storage system 100. In step 618, host 120 sends a request to transmit boot code to storage system 100 by holding the command line CMD at the preset level for the predetermined number of clock cycles (e.g., 75) during a second initial time period. In step 620, the control circuit of storage system 100 receives the request to transmit the boot code (from step 618) by sensing that the host has held the command line signal CMD at the preset level (e.g. ground) for the predetermined number of clock cycles during the second initial time period (which is after the first initial time period). In step 622, the control circuit checks the status of the flag (that may or may not have been set in step 614). If the flag is set, then the control circuit will reset the flag in step 622. If the flag is set, it means that the previous attempt to transfer the boot code failed. In step 624, the control circuit is configured to automatically choose a lower transmission speed than the first transmission speed in response to the boot code not being successfully transferred, which was learned by the control circuit by checking the status of the flag in step 622. Step 624 is performed in response to steps 618, 620 and 622. In step 626, the control circuit commences transmission of the boot code to the host at the lower transmission speed that was automatically chosen in step 624. In some embodiments, the host can choose the lower transmission speed. In other embodiments, the lower transmission speed will not be chosen automatically. In step 628, the host successfully receives all the boot code transmitted. Note that steps 626 and 628 could include transmitting the tuning block also. In step 630, the host changes the command line CMD to indicate that the boot code was successfully transferred; for example, by raising the command line to $V_{DD}$ (or another positive voltage). In one embodiment, $V_{DD}$ is at a magnitude between 2.5-6 volts. In one embodiment steps 616-630 of FIG. 6 are an example implementation of step 508 of FIG. 5.

Figure 7:
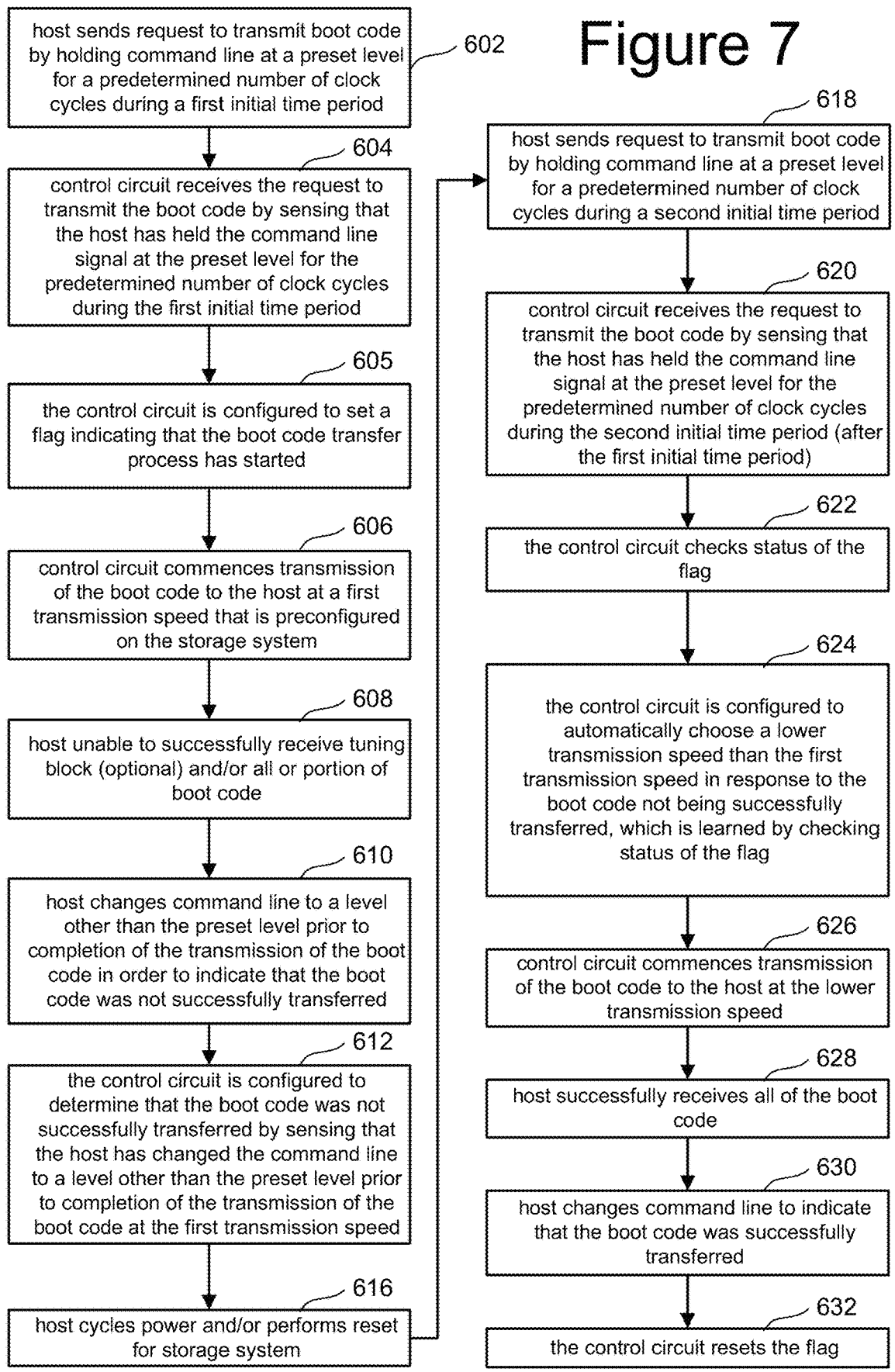
FIG. 7 is a flow chart describing one embodiment of a process for transferring boot code from a storage system to a host.

FIG. 7 is a flowchart describing one embodiment of a process for implementing a fast boot code transfer from storage system 100 to host 120 with a fall back to a lower speed boot code transfer if there is a problem with the fast boot code transfer. In one embodiment, the process of FIG. 7 is performed by any one of the control circuits of storage system 100 discussed above. For example, in one implementation, the process of FIG. 7 is performed by or at the direction of memory controller 102 (or another processor in storage system 100). The process of FIG. 7 is one example implementation of the process of FIG. 5. The process of FIG. 7 is similar to the process of FIG. 6 (as noted by the common reference numbers), with the difference being in the use of the flag. For example, in the process of FIG. 7, step 605 (performed after step 604 and before 606) includes the control circuit setting the flag to indicate that the boot code transfer process has started. Step 614 of FIG. 6 is omitted from the process of FIG. 7. Step 622 of FIG. 7 has been changed from step 622 of FIG. 6 in that while the control circuit will check the status of the flag, the flag will not be reset in step 622. Additionally, at the end of the process of FIG. 7, in step 632, the control circuit will reset the flag. Thus, in the process of FIG. 6 the flag is used to indicate that the transfer of the boot code has failed. In the process of FIG. 7, the flag is used to indicate that the boot code transfer process has started and when the boot code transfer process has completed the flag is reset. Therefore, when performing the process of FIG. 7, if the storage system receives a request to transmit boot code and the flag is already set, that means that the previous transfer of the boot code failed so that the current transfer is the fall back mode to be performed at the lower transmission speed.

Figure 8:
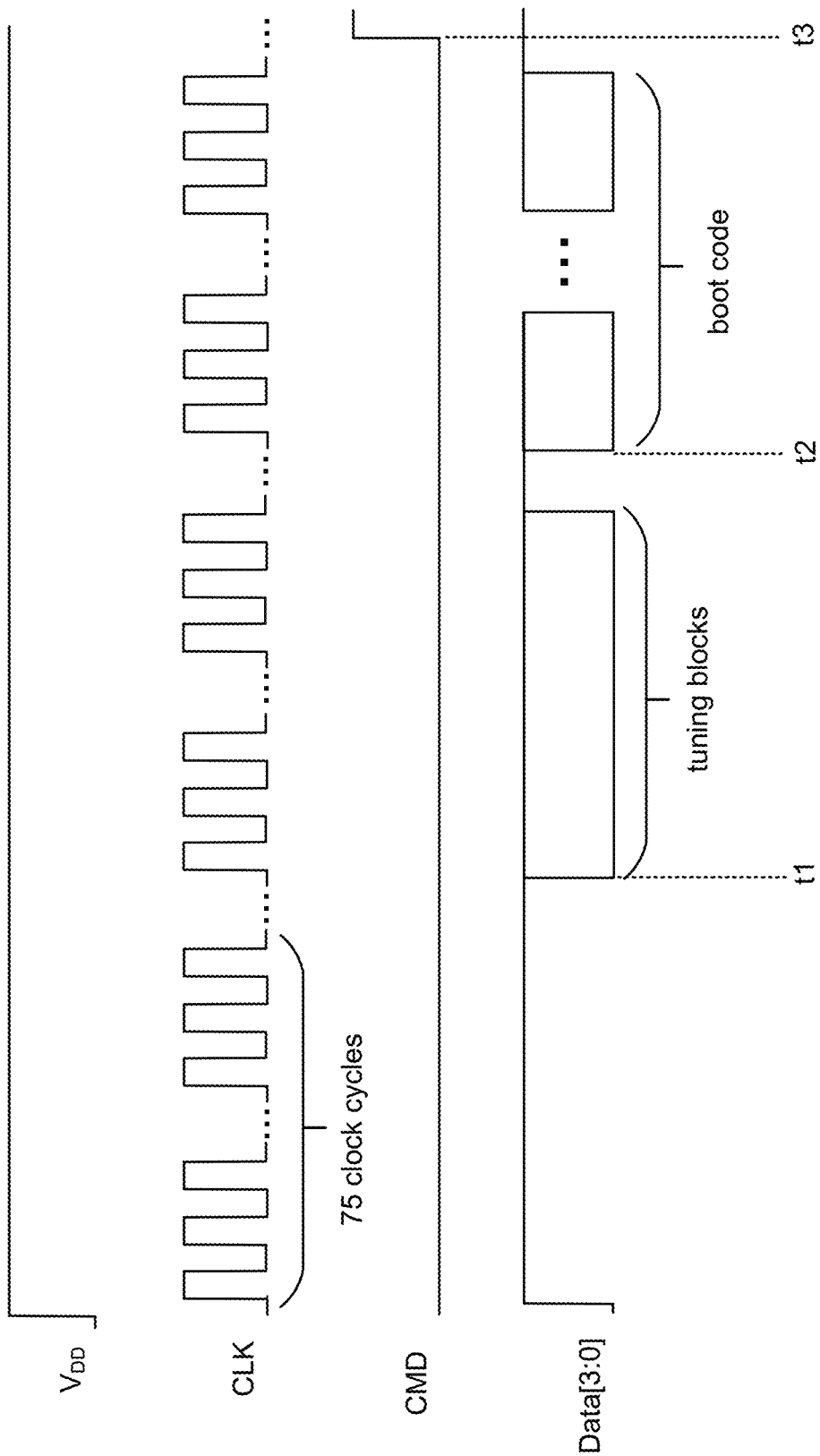
FIG. 8 is a timing diagram describing one embodiment of a process for transferring boot code from a storage system to a host.

FIG. 8 is a timing diagram describing one embodiment of the process of transferring boot code from storage system 100 to host 120. FIG. 8 shows an example of signals $V_{DD}$, CLK, CMD and Data[3:0] for any of the processes of FIG. 5, 6 or 7. FIG. 8 shows an example of the transfer of the boot code 350 when there are no errors. The power signal $V_{DD}$ is shown being raised from ground to a power voltage often referred to as itself as $V_{DD}$ and remains there the entire time period during FIG. 8 in order to power storage system 100. In FIG. 8, the clock signal CLK is a series of pulses. In order to request transfer of the boot code, host 120 holds the command line CMD down at ground (e.g., 0 volts) for at least the first 75 clock cycles. In response to receiving the request via the command line CMD (e.g., CMD held at 0 v for 75 clock cycles), storage system 100 transfers the tuning blocks (optional) and the boot code. When power is first turned on to storage system 100, the data lines Data[3:0] are floating. In response to sensing that CMD is held at ground for 75 clock cycles, storage system 100 starts the process of transferring the boot code. The period before t1, when CMD is held at ground for 75 clock cycles, corresponds to steps 602 and 604 of FIG. 6. At time t1, one or more tuning blocks are transmitted on Data[3:0]. If CMD is still held low (indicating tuning process successful) then at time t2 the boot code is transmitted between times t2 and t3. Note that the time period between t2 and t3 corresponds to step 606 of FIG. 6. FIG. 8 shows that the boot code was transferred successfully because after the boot code has completed being transferred on Data[3:0], host 120 raises the command line CMD to $V_{DD}$ (or another positive) at time t3.

Figure 9:
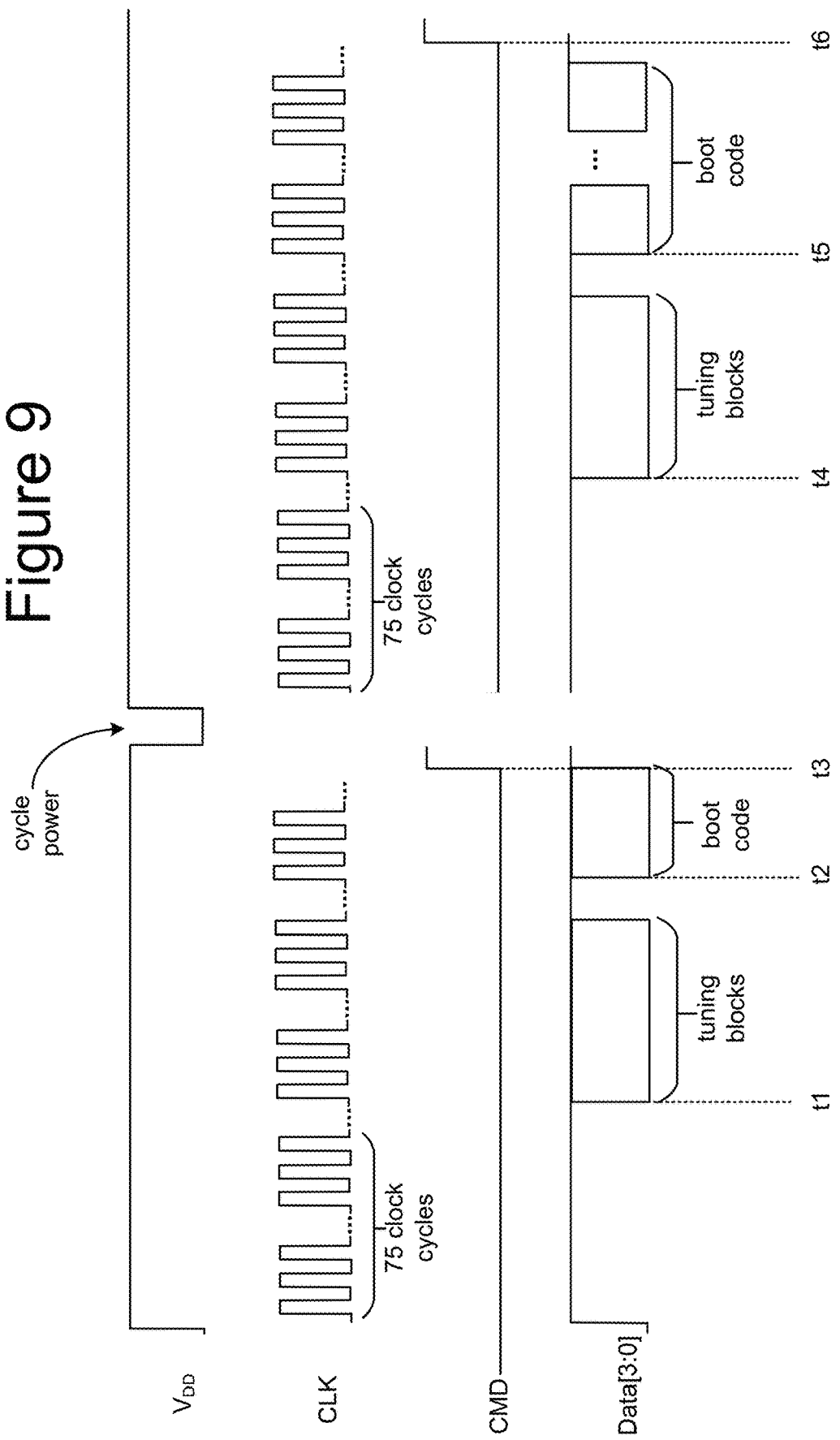
FIG. 9 is a timing diagram describing one embodiment of a process for transferring boot code from a storage system to a host.

FIG. 9 is a timing diagram describing one embodiment of a process for transferring boot code from storage system 100 to host 120. FIG. 9 shows the behavior of the signals $V_{DD}$, CLK, CMD and Data[3:0] during an example when there is an error in the transmission of the boot code. FIG. 9 is an example implementation of performing any one of the processes of FIG. 5, 6 or 7. Initially, host 120 provides power to storage system 100 by raising $V_{DD}$ to the power voltage required by storage system 100 (often referred to as $V_{DD}$). The signal CLK will provide a clock from host 120 to storage system 100. In order to request transmission of the boot code, host 120 will hold the command line CMD low (e.g., ground) during at least the first 75 clock cycles, which corresponds to steps 602 and 604 of FIG. 6. In response to the request to transmit the boot code, at time t1 storage system 100 sends one or more tuning blocks. In some embodiments, tuning blocks will not be transmitted and no tuning process will occur. In the example of FIG. 9, the tuning blocks were successfully transferred as depicted by the command line CMD not being raised to $V_{DD}$ subsequent to the tuning blocks completing and prior to the boot code being transferred. At time t2, the control circuit of storage system 100 commences transmission of the boot code to host 120 at the first transmission speed, which corresponds to step 606. However, in this example host 120 is unable to successfully receive the boot code (step 608); therefore, at time t3 host 120 changes the command line CMD by raising it to $V_{DD}$ (which corresponds to steps 610 and 612). Host 120 then cycles the power to storage system 100 after time t3 (corresponding to step 616) and the clock signal CLK will start again. Prior to time t4, host 120 holds the command line CMD at 0 v (ground) for at least 75 clock cycles during a second initial time period corresponding to steps 618 and 620. At time t4, storage system 100 transmits one or more tuning blocks (optional). At time t5, storage system 100 transmits boot code (corresponding to steps 626 and 628) at the lower transmission speed. FIG. 9 does not show a difference in the clock cycles for the first transmission speed or the lower transmission speed in order to keep the drawing readable, and it is unclear how the transmission speed will change (e.g. by changing the clock or changing when data is sampled, or both). In this example, the boot code transferred between times t5 and t6 is transferred successfully (see step 628); therefore at time t6 (step 630) host 120 changes the command line by raising it to $V_{DD}$ to indicate that the boot code was successfully transferred. In this example, storage system 100 receives the indication from the host that the boot code was not successfully transferred either by the CMD being raised to $V_{DD}$ at time t3 or the cycling of the power or both.

Figure 10:
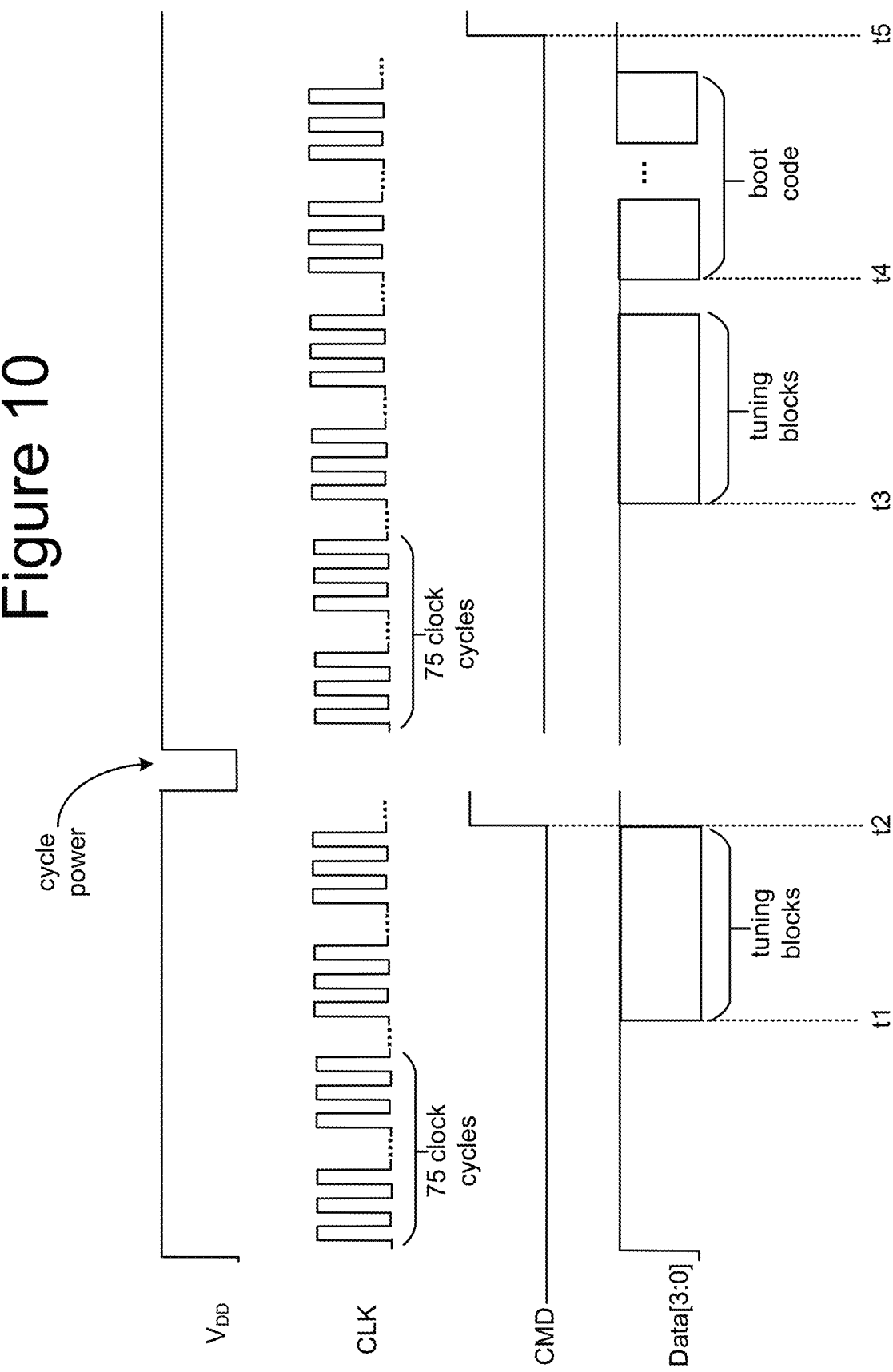
FIG. 10 is a timing diagram describing one embodiment of a process for transferring boot code from a storage system to a host.

FIG. 10 is a timing diagram describing one embodiment of a process of transferring boot code from a storage system to a host. The process of FIG. 10 shows the behavior of the signals $V_{DD}$, CLK, CMD and Data[3:0] for the processes of FIG. 5, 6 or 7 when there is an error transmitting the tuning blocks or tuning. FIG. 10 shows that host 120 powers storage system 100 by supplying $V_{DD}$ (power). The clock signal provides the same clock cycles as discussed above with respect to FIGS. 8 and 9. Host 120 sends a request to transmit boot code by holding the command line CMD low (ground) for at least 75 clock cycles prior to time t1 (corresponding to steps 602 and 604). At time t1, storage system 100 begins transmitting the tuning blocks. In this example, either the tuning blocks are not received successfully or the tuning blocks are received but the tuning process fails. Either way the host will raise the command line CMD to $V_{DD}$ (which corresponds to steps 610 and 612). Host 120 then cycles the power (step 616) and host 120 holds the command line CMD low (e.g., 0 v or ground) for at least 75 clock cycles (corresponding to steps 618 and 620) in order to request transmission of boot code during the second initial time period. At time t3, storage system 100 sends the tuning blocks. This time tuning is performed successfully. At time t4, storage system 100 transmits the boot code to host 120 (corresponding to steps 626 and 628). Because the boot code was received successfully, at time t5 host 120 raises the command line CMD to $V_{DD}$ (corresponding to step 630).

Figure 11:
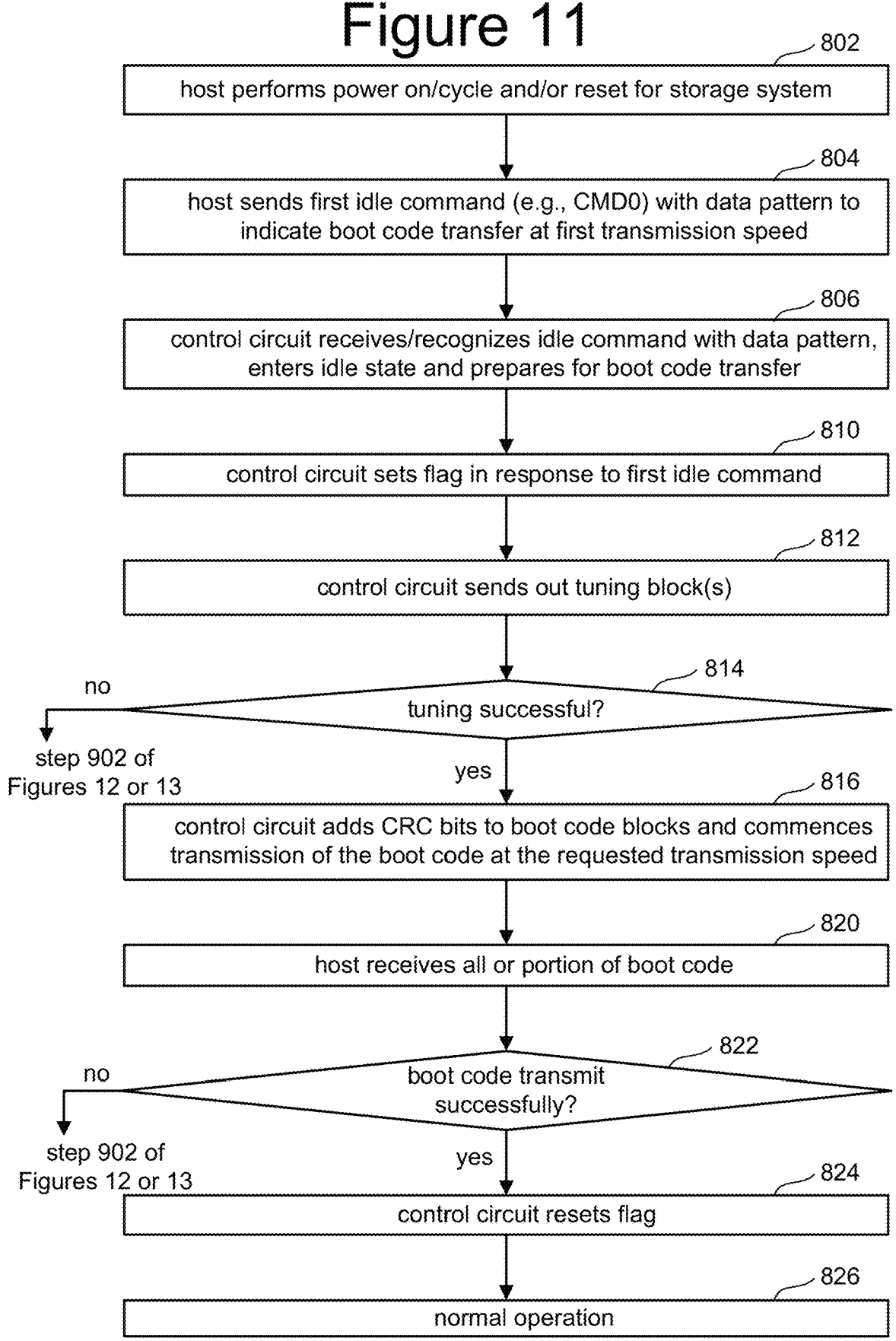
FIG. 11 is a flow chart describing one embodiment of a process for transferring boot code from a storage system to a host.

FIG. 11 is a flowchart describing another embodiment of the process for implementing a fast boot code transfer from storage 100 to host 120 with a fall back to a lower speed boot code transfer if there is a problem with the fast boot code transfer. In one embodiment, the process of FIG. 11 is performed by any one of the control circuits of storage system 100 discussed above. For example, in one implementation, the process of FIG. 11 is performed by or at the direction of memory controller 102 (or another processor in storage system 100). The process of FIG. 11 is one example implementation of the process of FIG. 5.

In step 802 of FIG. 11, 120 host performs a power on or cycle of the power, and/or reset of storage system 100. In step 804, host 120 sends a first idle command with a data pattern to indicate a first transmission speed. The idle command is sent to storage system 100. One example of an idle command is CMD0, which is a command for the SD card interface. Looking back at FIG. 4, each command includes a command index and an argument. CMD0 has a specific bit pattern for the command index, and usually has all zeros for its argument. However, it is proposed to include a non-zero data pattern in the argument field that indicates the requested transfer speed. In another embodiment, the data pattern can also indicate whether to include or not include a tuning block. The table below includes a set of example data patterns to include in the argument field (bits 39:8 of the command—see FIG. 4).

| Data Pattern For Argument Field | Transmission Speed | Include Tuning block (Yes or No) |
|---|---|---|
| 0xF0F0F0F0 | Pre-defined | No |
| 0xF1F1F1F1 | SD HS (25 MB/s) | No |
| 0xF2F2F2F2 | DDR50 (50 MB/s) | No |
| 0xF3F3F3F3 | SDR104 (104 MB/s) | No |
| 0xE0E0E0E0 | Pre-defined | Yes |
| 0xE1E1E1E1 | SD HS (25 MB/s) | Yes |
| 0xE2E2E2E2 | DDR50 (50 MB/s) | Yes |
| 0xE3E3E3E3 | SDR104 (104 MB/s) | Yes |

Data patterns 0xF0F0F0F0 and 0xE0E0E0E0 indicate to use a predefined transmission speed. In some embodiments, host 120 can set a configuration parameter in storage system 100 with the predefined transmission speed (e.g., one of SD HS, DDR50 or SDR104). Alternatively, storage system 100 can be preconfigured with the predefined transmission speed.

The data patterns and associated transmission speeds of the above table are only one set of examples. Other data patterns and transmission speeds can also be used. Additionally, other embodiments can implement more or less than the number of data patterns and transmission speeds indicated above.

In step 806 of FIG. 11, the control circuit receives and/or recognizes the idle command with its data pattern and enters an idle state. The control circuit will also start preparation for the boot code transfer, which can include reading the boot code from memory array 302. Steps 804 and 806 of FIG. 11 are an example implementation of step 502 of FIG. 5.

In step 810 of FIG. 11, the control circuit will set a flag in response to the first idle command. As discussed above, the control circuit on the storage system 100 can include a flag stored in non-volatile memory that indicates that a boot code transfer process has begun. In step 812, the control circuit sends out a tuning block if the data pattern in the idle command indicated to include a tuning block. In step 814, if the tuning block was transferred successfully and host 120 was able to tune successfully, then in step 816 the control circuit will add CRC bits to the boot code blocks read from memory array 102 and commence transmission of the boot code at the requested transmission speed. If the tuning was unsuccessful (including the tuning block was not successfully transmitted or the tuning was successfully transmitted but the host was unable to tune), then after step 814 the process continues at step 902 of FIG. 12 (or FIG. 13) to perform the fall back condition.

If the tuning was successful then in step 816 the boot code is transferred from the storage system 100 to the host 120. In step 820, the host receives all or a portion of the boot code 350. If the boot code was transmitted successfully (step 822), then the control circuit will reset the flag (that was set in step 818) in step 824, and both the host and storage system will enter normal operation in step 826. For example, host 120 will complete the boot process and then operate in its intended capacity. If, however, the boot code was not transmitted successfully (step 822), then the process continues in step 902 of FIG. 12 (or FIG. 13). In one embodiment steps 810-820 of FIG. 11 are an example implementation of step 504 of FIG. 5.

Figure 12:
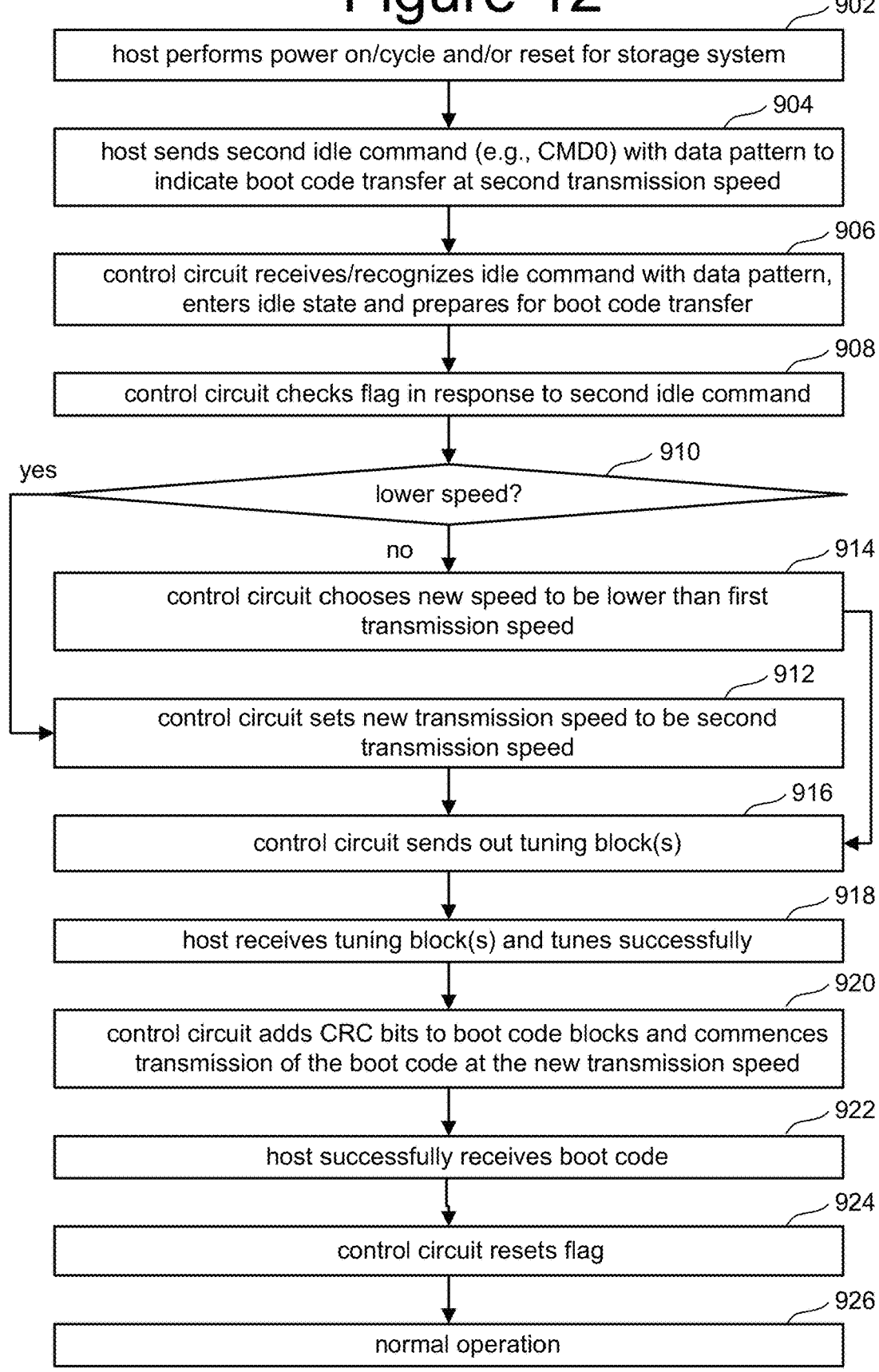
FIG. 12 is a flow chart describing one embodiment of a process for transferring boot code from a storage system to a host.

FIG. 12 is a flowchart describing one embodiment of the process of performing the fall back to a lower speed boot code transfer when there is a problem with the fast boot code transfer. For example, in FIG. 11, step 816 includes transferring the boot code at a requested transmission speed, where that requested transmission speed is the fast transmission speed. If that transmission of the boot code failed, a fall back process is performed according to the steps of FIG. 12. In one embodiment, the process of FIG. 12 is performed by any one of the control circuits of storage system 100 discussed above. For example, in one implementation, the process of FIG. 12 is performed by or at the direction of memory controller 102 (or another processor in storage system 100). The process of FIG. 12 is an example implementation of steps 506 and 508 of FIG. 5.

Step 902 of FIG. 12 is performed if tuning was not successful (step 814) of the boot code transfer was not successful (step 822). In step 902, host 120 performs a power on or cycling of the power, or otherwise resets storage system 100. In step 904, host 120 sends a second idle command (e.g. CMD0) with a data pattern to indicate a boot code transfer at a second transmission speed. The data patterns discussed above can be used. In step 906, the control circuit receives or otherwise recognizes the second idle command with the data pattern and enters an idle state. In addition, the control circuit prepares to transfer the boot code 350. In step 908, the control circuit checks the flag in response to the second idle command. This flag will indicate to the control circuit whether this is a fall back condition because of a failed transfer or whether this is an initial attempt to transfer the boot code. In step 910, the control circuit determines whether the requested transmission speed (the second transmission speed indicated in the data pattern—see step 904) is lower than the first transmission speed of step 804 of FIG. 11. In one embodiment, the host can choose the lower transmission speed using the data pattern of step 904. In that example, step 910 of FIG. 12 will include the control circuit determining whether the second transmission speed is lower than the first transmission speed. If not, then in step 914 the control circuit will choose a new transmission speed which is lower than the first transmission speed. If the second transmission speed indicated in the data pattern of step 904 is lower than the first transmission speed in step 912, the control circuit sets the new transmission speed to be the second transmission speed. In another option, the data pattern can indicate to use the pre-defined transmission speed already set in a configuration register or memory location. However if the idle command and data pattern in step 804 also indicated to use the pre-configured transmission speed then in step 910 it would be determined that the new speed requested is not lower than the first transmission speed and therefore the control circuit will have to automatically chose the new transmission speed to be a speed that is lower than the first transmission speed. Note that steps 910-914 are performed in response to the flag being set.

In step 916, the control circuit sends out a tuning block. Step 916 is only performed if the data pattern indicates to use a tuning block. If the data pattern does not indicate to use a tuning block then the process would skip to step 920. If a tuning block is to be used, then that tuning block is transmitted to the host in step 916 and received by the host in step 918. In step 920, the control circuit adds CRC bits to the boot code blocks and commences transmission of the boot code at the new transmission speed. In step 922 the host 120 successfully receives the boot code. As a result of the successful transfer of the boot code, the control circuit resets the flag (see step 908). In step 926, the system enters normal operation; for example, the boot process is performed and the host 120 and storage system 100 are used for their intended purposes.

Figure 13:
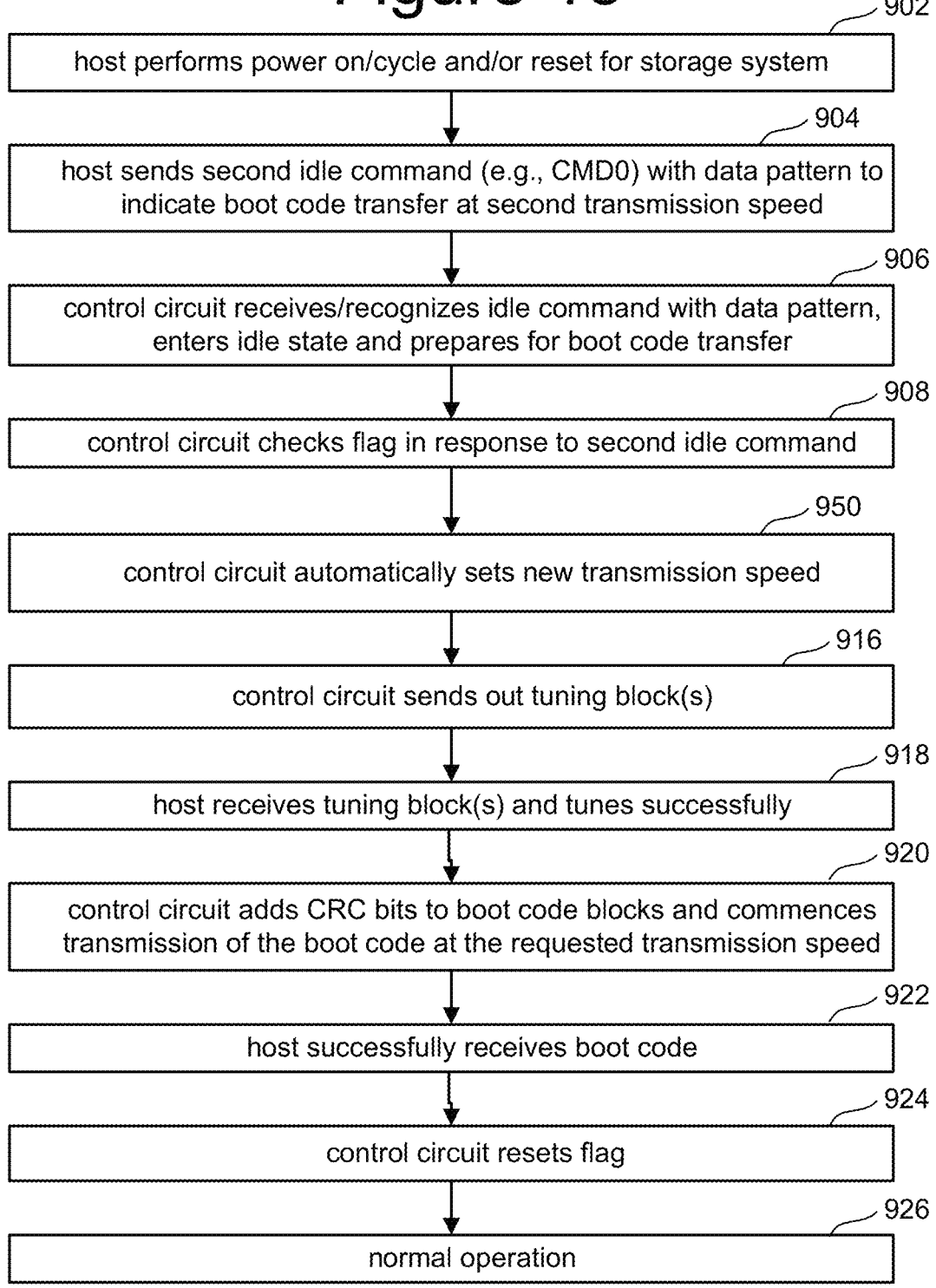
FIG. 13 is a flow chart describing one embodiment of a process for transferring boot code from a storage system to a host.

FIG. 13 is a flowchart describing another embodiment of the process for implementing the fall back process when the boot code transfer at the initial fast boot code speed was not successful. FIG. 13, is performed in conjunction with the process of FIG. 11, and is an alternative embodiment to the process of FIG. 12. In one embodiment the process of FIG. 13 is performed by any of the control circuits of storage system 100 discussed above. For example, in one implementation, the process of FIG. 13 is performed by or at the direction of memory controller 102 (or another processor in storage system 100). The process of FIG. 13 is another example implementation of steps 506 and 508 of FIG. 5. The process of FIG. 13 starts out with the same steps 902-908 as FIG. 12. However, the process of FIG. 13 deviates from the process of FIG. 12 in step 950 (performed after step 908) in which the control circuit automatically sets the new transmission speed. That is, regardless of the data pattern included with the idle command, the control circuit will automatically choose the lowest transmission speed available or the next lowest transmission speed from the first transmission speed. After step 950, the process of FIG. 13 includes performing steps 916 through 926, which are the same as in FIG. 12.

Figure 14:
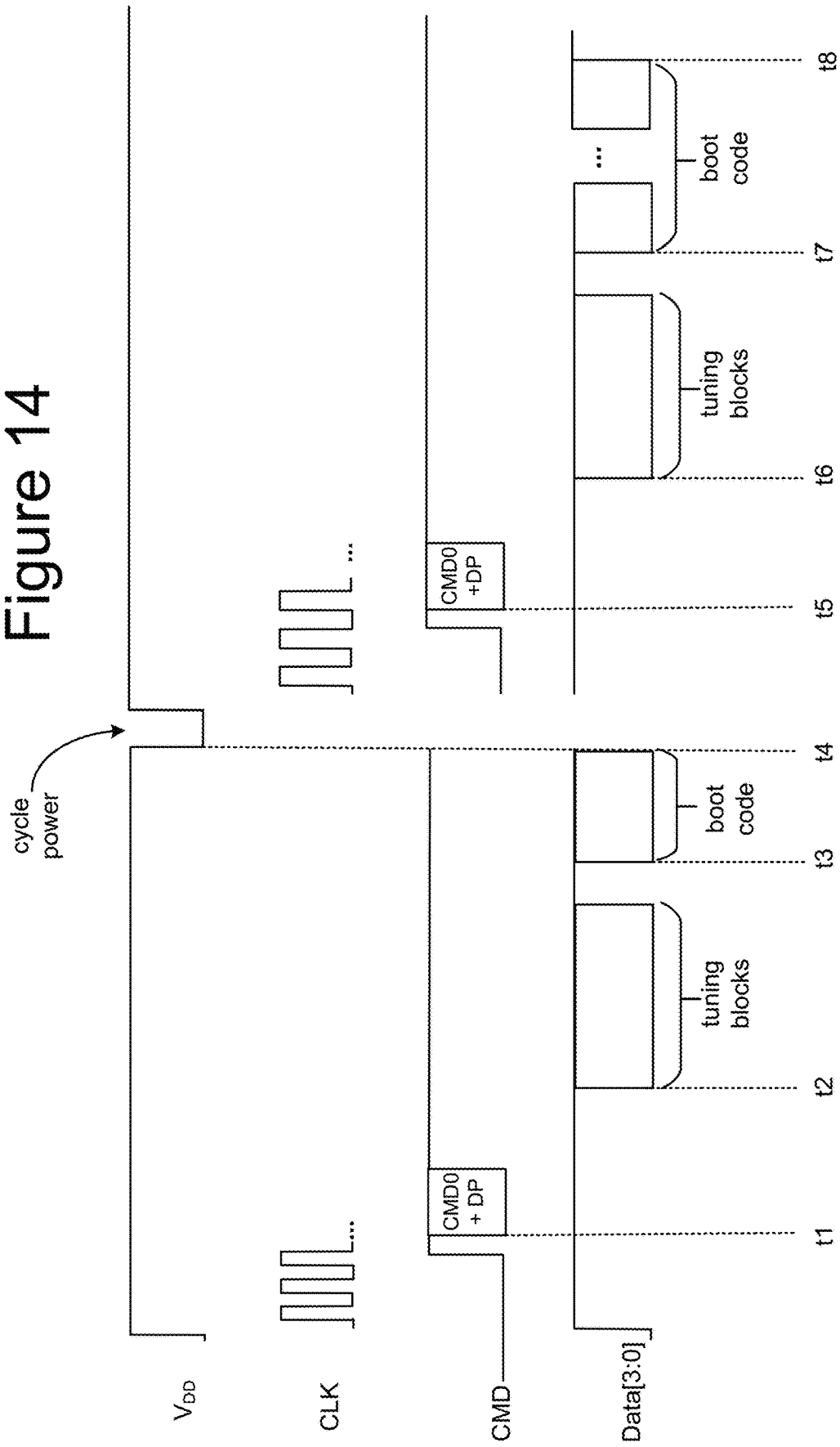
FIG. 14 is a timing diagram describing one embodiment of a process for transferring boot code from a storage system to a host.

FIG. 14 is a timing diagram describing the behavior or the signals $V_{DD}$, CLK, CMD and Data[3:0] during the performance of the process used in FIGS. 11-13. Initially, power ($V_{DD}$) is provided to storage system 100. The signal CLK provides the clock, as discussed above. The first idle command is sent at time t1 on the command line CMD and includes a serial set of bits indicating the command with the data pattern in accordance with the structure depicted in FIG. 4. This corresponds to steps 804 and 806. At time t2, the tuning block(s) (step 812) are transferred on the data lines Data[3:0]. In the example of FIG. 14, it is assumed that the data pattern included with the idle command requests tuning blocks, the tuning blocks are transmitted successfully, and host 120 successfully tunes. At time t3 a portion of boot code 350 is transferred on Data[3:0]. This corresponds to steps 816 and 820 of FIG. 11. By time t4, host 120 has determined that the boot code is not being transferred successfully. For example, the data may be corrupted and not recoverable using the CRC bits. Therefore, host 120 cycles the power at time t4 (step 902). After the power turns back on and is provided to storage system 100, the clock signal CLK is once again provided from host 120 to storage system 100. At time t5, host 120 sends the second idle command with the data pattern (step 904). In step 916, tuning blocks are transmitted on Data[3:0], as per steps 916 and 918. At time t7, the boot code is transferred from the control circuit of storage system 100 to host 120, as per steps 920 and 922. The transfer of the boot code has completed successfully by time t8.

A non-volatile storage system has been disclosed that can store boot code for a host and transfer that boot code to the host as part of a boot process such that the transfer of the boot code to the host is performed at a high speed to mitigate the impact of the transfer on the overall time needed to complete the boot process. However, if the transfer of the boot code fails, rather than conclude that the non-volatile storage system inoperable (and, possibly replace it), the non-volatile storage system falls back to a failsafe mode in which the boot code is transferred at a lower speed thereby increasing the chance that the transfer of the boot code will be successful.

One embodiment includes a non-volatile storage apparatus comprising non-volatile memory configured to store boot code and a control circuit connected to the non-volatile memory. The control circuit is configured to: receive a request to transmit boot code to an entity external to the non-volatile storage apparatus, commence transmission of the boot code to the entity at a first transmission speed, determine that the boot code was not successfully transferred, and transmit the boot code to the entity at a lower transmission speed than the first transmission speed.

In one example implementation, the control circuit is configured to receive the request to transmit the boot code by sensing that the entity has held a command line signal at a preset level for a predetermined number of clock cycles during a first time period; the control circuit is configured to determine that the boot code was not successfully transferred by sensing that the entity has changed the command line signal to a level other than the preset level prior to completion of the transmission of the boot code to the entity at the first transmission speed; the control circuit is configured to sense that the entity has held the command line signal at the preset level for the predetermined number of clock cycles during a second time period that is after the first time period; and the control circuit is configured to automatically choose the lower transmission speed in response to the boot code not being successfully transferred and in response to sensing that the entity has held the command line signal at the preset level for the predetermined number of clock cycles during the second time period.

In one example implementation, the control circuit is configured to receive the request to transmit the boot code by receiving a first idle command from the entity to put the non-volatile storage apparatus in an idle state, the idle command includes a first data pattern indicating the first transmission speed; the control circuit is configured to determine that the boot code was not successfully transferred by having its power cycled or receiving a second idle command with a new data pattern indicating the lower transmission speed; and the control circuit is configured to transmit the boot code to the entity at the lower transmission speed in response to the second idle command with the new data pattern.

One embodiment incudes a method of operating a non-volatile storage apparatus, comprising: receiving a first request at the non-volatile storage apparatus from a host to transmit boot code to the host, the boot code is stored in non-volatile memory in the non-volatile storage apparatus; in response to the first request, transmitting at least a portion of the boot code from the non-volatile storage apparatus to the host at a first transmission speed; receiving a second request at the non-volatile storage apparatus from the host to transmit the boot code to the host; and transmitting the boot code from the non-volatile storage apparatus to the host at a second transmission speed that is lower than the first transmission speed.

One example implementation includes a non-volatile storage apparatus comprising non-volatile memory configured to store boot code for a host and a control circuit connected to the non-volatile memory. The control circuit includes a host interface for communicating with the host. The control circuit is configured to read the boot code stored in the non-volatile memory. The control circuit further comprises means for first transmitting the boot code to the host at a first transmission speed and, in response to the first transmitting the boot code being unsuccessful, automatically choosing a second transmission speed lower than the first transmission speed and re-transmitting the boot code to the host at the second transmission speed.

Examples structures for the means for first transmitting the boot code to the host at a first transmission speed, automatically choosing a second transmission speed lower than the first transmission speed and re-transmitting the boot code to the host at the second transmission speed include (but are not limited to) a microprocessor, microcontroller, RISC processor, FPGA, state machine, and/or combination therefore, for example, memory controller 102, FEP 110, memory processor 156, and/or state machine 362 performing any of the processes of FIG. 5, FIG. 6, FIG. 7, FIG. 9, FIG. 10, FIG. 11 with FIG. 12 or 13, and/or FIG. 14.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile storage apparatus, comprising:
   non-volatile memory configured to store boot code; and
   a control circuit connected to the non-volatile memory, wherein the control circuit is configured to:
     receive a request to transmit the boot code to an entity external to the non-volatile storage apparatus,
     commence a first transmission of the boot code to the entity at a first transmission speed,
     determine that the boot code was not successfully transferred during the first transmission, and
     in response to determining that the boot code was not successfully transferred during the first transmission, perform a second transmission of the boot code to the entity at a lower transmission speed than the first transmission speed.

2. The non-volatile storage apparatus of claim 1, wherein the control circuit is further configured to:
   receive the request from a host, wherein the host is the entity external to the non-volatile storage apparatus; and
   determine that the boot code was not successfully transferred by receiving an indication from the host that the boot code was not successfully transferred.

3. The non-volatile storage apparatus of claim 1, wherein the control circuit is further configured to:

read the boot code from the non-volatile memory; and
add error correction to the boot code prior to the commencing the first transmission of the boot code.

4. The non-volatile storage apparatus of claim 1, wherein the control circuit is further configured to:
read the boot code from a first location in the non-volatile memory for the commencing the first transmission of the boot code to the entity at the first transmission speed; and
read the boot code from the first location in the non-volatile memory for the performing the second transmission of the boot code to the entity at the lower transmission speed.

5. The non-volatile storage apparatus of claim 1, wherein: the boot code transmitted to the entity at the lower transmission speed is the same boot code for which transmission was commenced to the entity at the first transmission speed.

6. The non-volatile storage apparatus of claim 1, wherein the control circuit is further configured to:
communicate with the entity at three or more transmission speeds that include a lowest transmission speed and a highest transmission speed; and
perform, in response to the determining that the boot code was not successfully transferred, the second transmission of the boot code to the entity at the lowest transmission speed even if there is another transmission speed lower than the first transmission speed and higher than the lowest transmission speed.

7. The non-volatile storage apparatus of claim 1, wherein the control circuit is further configured to:
communicate with the entity at three or more transmission speeds that include a lowest transmission speed; and
perform the second transmission of the boot code to the entity at the lower transmission speed by transmitting the boot code to the entity at a next lowest transmission speed relative to the first transmission speed, wherein the next lowest transmission speed relative to the first transmission speed is higher than the lowest transmission speed.

8. The non-volatile storage apparatus of claim 1, wherein the control circuit is further configured to:
receive the request to transmit the boot code by sensing that the entity has held a command line signal at a preset level for a predetermined number of clock cycles during a first time period;
determine that the boot code was not successfully transferred by sensing that the entity has changed the command line signal to a level other than the preset level prior to completion of the first transmission of the boot code to the entity at the first transmission speed;
sense that the entity has held the command line signal at the preset level for the predetermined number of clock cycles during a second time period that is after the first time period; and
automatically choose the lower transmission speed in response to the boot code not being successfully transferred and in response to sensing that the entity has held the command line signal at the preset level for the predetermined number of clock cycles during the second time period.

9. The non-volatile storage apparatus of claim 8, wherein the control circuit is further configured to:
set a flag indicating that the boot code was not successfully transferred in response to sensing that the entity has changed the command line signal to the level other than the preset level prior to completion of the transmission of the boot code to the entity at the first transmission speed; and
automatically choose the lower transmission speed in response to checking status of the flag.

10. The non-volatile storage apparatus of claim 8, wherein the control circuit is further configured to:
set a flag in response to the commencing the first transmission of the boot code to the entity at the first transmission speed;
reset the flag when completing successful transmission of the boot code; and
automatically choose the lower transmission speed in response to checking status of the flag.

11. The non-volatile storage apparatus of claim 1, wherein the control circuit is further configured to:
receive the request to transmit the boot code by receiving a first idle command from the entity to put the non-volatile storage apparatus in an idle state, wherein the idle command includes a first data pattern indicating the first transmission speed;
determine that the boot code was not successfully transferred by having its power cycled and receiving a second idle command with a new data pattern indicating the lower transmission speed; and
perform the second transmission of the boot code to the entity at the lower transmission speed in response to the second idle command with the new data pattern.

12. The non-volatile storage apparatus of claim 11, wherein:
the new data pattern indicates to transmit a tuning block to the entity; and
the control circuit is further configured to transmit the tuning block to the entity prior to the control circuit performing the second transmission of the boot code to the entity at the lower transmission speed.

13. The non-volatile storage apparatus of claim 1, wherein the control circuit is further configured to:
receive the request to transmit the boot code by receiving a first idle command from the entity to put the non-volatile storage apparatus in an idle state, the idle command includes a first data pattern indicating to transmit the boot code;
set a flag in response to the first idle command;
determine that the boot code was not successfully transferred by having its power cycled or receiving a second idle command with a new data pattern indicating to transmit the boot code;
check status of the flag in response to the second idle command; and
perform the second transmission of the boot code at the lower transmission speed in response to the flag being set.

14. The non-volatile storage apparatus of claim 1, wherein the control circuit is further configured to:
receive the request to transmit the boot code by receiving a first idle command from the entity to put the non-volatile storage apparatus in an idle state, wherein the idle command includes a first data pattern indicating to transfer the boot code at the first transmission speed;
set a flag in response to the first idle command;
determine that the boot code was not successfully transferred by having its power cycled or receiving a second idle command with a new data pattern indicating to transmit the boot code at a new transmission speed;
check status of the flag in response to the second idle command;

re-transmit, in response to the flag being set, the boot code at the new transmission speed if the new transmission speed is lower than the first transmission speed;

choose, in response to the flag being set, the lower transmission speed and re-transmit the boot code at the lower transmission speed if the new transmission speed is not lower than the first transmission speed; and reset the flag after successfully transmitting the boot code.

15. The non-volatile storage apparatus of claim 1, wherein the control circuit is further configured to:

receive the request from a host, wherein the host is the entity external to the non-volatile storage apparatus; and use the lower transmission speed without an indication to use the lower transmission speed from the host.

16. The non-volatile storage apparatus of claim 1, wherein:

the control circuit is further configured to receive the request to transmit the boot code by receiving a first idle command from the entity to put the non-volatile storage apparatus in an idle state, wherein the idle command includes a first data pattern indicating to transfer a tuning block and transfer the boot code at the first transmission speed;

the control circuit is further configured to transmit the tuning block to the entity prior to the commencing the first transmission of the boot code in order for the entity to tune reception from the non-volatile storage apparatus; and the boot code was not successfully transferred because the entity failed to successfully tune using the tuning block.

17. A method of operating a non-volatile storage apparatus, comprising:

receiving a first request at the non-volatile storage apparatus from a host to transmit boot code to the host, wherein the boot code is stored in non-volatile memory in the non-volatile storage apparatus;

in response to the first request, transmitting at least a portion of the boot code from the non-volatile storage apparatus to the host at a first transmission speed;

receiving a second request at the non-volatile storage apparatus from the host to transmit the boot code to the host; and in response to the boot code not successfully being transferred from the non-volatile storage apparatus to the host at the first transmission speed in response to the first request, transmitting the boot code from the non-volatile storage apparatus to the host at a second transmission speed that is lower than the first transmission speed.

18. The method of claim 17, further comprising:

receiving an indication from the host that the boot code was not successfully transferred after the transmitting at least the portion of the boot code from the non-volatile storage apparatus to the host at the first transmission speed; and automatically choosing the second transmission speed.

19. A non-volatile storage apparatus, comprising:

non-volatile memory configured to store boot code for a host; and a control circuit connected to the non-volatile memory, wherein the control circuit includes a host interface for communicating with the host, wherein the control circuit is configured to read the boot code stored in the non-volatile memory;

wherein the control circuit further comprises means for first transmitting the boot code to the host at a first transmission speed and, in response to the first transmitting the boot code being unsuccessful, automatically choosing a second transmission speed lower than the first transmission speed and re-transmitting the boot code to the host at the second transmission speed.

* * * * *